(12) United States Patent
Moganty et al.

(10) Patent No.: US 10,418,625 B2
(45) Date of Patent: Sep. 17, 2019

(54) SULFUR-INFUSED CARBON FOR SECONDARY BATTERY MATERIALS

(71) Applicant: NOHMs Technologies, Inc., Rochester, NY (US)

(72) Inventors: Surya S. Moganty, Henrietta, NY (US); Jayaprakash Navaneedhakrishnan, Lexington, KY (US); Jonathan Lee, Rochester, NY (US); Richard Delmerico, Henrietta, NY (US); Nathan Ball, Lexington, KY (US); Emily McDonald, Lexington, KY (US)

(73) Assignee: NOHMS Technologies, Inc., Rochester, NY (US)

( * ) Notice: Subject to any disclaimer, the term of this patent is extended or adjusted under 35 U.S.C. 154(b) by 297 days.

(21) Appl. No.: 15/601,347

(22) Filed: May 22, 2017

(65) Prior Publication Data

US 2017/0263923 A1    Sep. 14, 2017

Related U.S. Application Data

(62) Division of application No. 14/083,764, filed on Nov. 19, 2013, now abandoned.
(Continued)

(51) Int. Cl.
*H01M 4/00* (2006.01)
*H01M 4/02* (2006.01)
(Continued)

(52) U.S. Cl.
CPC ............. *H01M 4/364* (2013.01); *B01J 19/02* (2013.01); *H01M 4/0471* (2013.01);
(Continued)

(58) Field of Classification Search
CPC .............. B01J 19/00; B01J 19/02; B01J 2219/02–0209; B01J 2219/0218;
(Continued)

(56) References Cited

U.S. PATENT DOCUMENTS 3,130,015 A    4/1964  Monroe
4,539,052 A *  9/1985  Palmer ..................... C23C 8/62
                                                              148/240
(Continued)

FOREIGN PATENT DOCUMENTS

CN    102324507 A    1/2012
GB       865256      4/1961
(Continued)

OTHER PUBLICATIONS

International Search Report and Written Opinion in corresponding International Application No. PCT/US2013/070768 dated May 23, 2014, pp. 1-15.
(Continued)

*Primary Examiner* — Natasha E Young
(74) *Attorney, Agent, or Firm* — Bond, Schoeneck & King, PLLC; Joseph Noto

(57) ABSTRACT

A reactor for producing a sulfur-infused carbonaceous material as a cathode material for use in a Li—S battery is described, including a reactor body capable of withstanding a pressure from about 1 atm to about 150 atm; and an inner sulfur-resistant layer at the inner surface of the reactor, wherein the inner layer is inert to sulfur vapor at a temperature from about 450° C. to about 1000° C.

6 Claims, 28 Drawing Sheets

Related U.S. Application Data

(60) Provisional application No. 61/872,300, filed on Aug. 30, 2013, provisional application No. 61/728,002, filed on Nov. 19, 2012.

(51) Int. Cl.

| | | |
|---|---|---|
| *H01M 4/04* | (2006.01) | |
| *H01M 4/13* | (2010.01) | |
| *H01M 4/136* | (2010.01) | |
| *H01M 4/1397* | (2010.01) | |
| *H01M 4/36* | (2006.01) | |
| *H01M 4/583* | (2010.01) | |
| *H01M 4/66* | (2006.01) | |
| *H01M 10/00* | (2006.01) | |
| *H01M 10/052* | (2010.01) | |
| *B01J 19/00* | (2006.01) | |
| *B01J 19/02* | (2006.01) | |

(52) U.S. Cl.
CPC ......... *H01M 4/136* (2013.01); *H01M 4/1397* (2013.01); *H01M 4/583* (2013.01); *H01M 4/663* (2013.01); *H01M 10/052* (2013.01); *B01J 2219/0209* (2013.01); *B01J 2219/029* (2013.01); *B01J 2219/0218* (2013.01); *B01J 2219/0236* (2013.01); *H01M 2004/021* (2013.01); *Y02E 60/122* (2013.01); *Y02P 70/54* (2015.11); *Y02T 10/7011* (2013.01)

(58) Field of Classification Search
CPC .......... B01J 2219/0236; B01J 2219/025; B01J 2219/0277; B01J 2219/029; H01M 4/00; H01M 4/02; H01M 4/04; H01M 4/0471; H01M 4/13; H01M 4/136; H01M 4/139; H01M 4/1397; H01M 4/36–364; H01M 4/58; H01M 4/583; H01M 4/64; H01M 4/66; H01M 4/663; H01M 10/00; H01M 10/05; H01M 10/052; H01M 2004/021; Y02E 60/00–122; Y02P 70/50; Y02P 70/54

See application file for complete search history.

(56) References Cited

U.S. PATENT DOCUMENTS

| | | |
|---|---|---|
| 5,565,393 A | 10/1996 | Felix et al. |
| 5,575,902 A | 11/1996 | Heyse et al. |
| 2002/0084559 A1 | 7/2002 | Hazlebeck |
| 2003/0113624 A1 | 6/2003 | Kim et al. |
| 2005/0196336 A1 | 9/2005 | Chatterjee et al. |
| 2006/0087798 A1 | 4/2006 | Kobayachi et al. |
| 2006/0098389 A1 | 5/2006 | Liu et al. |
| 2011/0052998 A1 | 3/2011 | Liang et al. |
| 2011/0002086 A1 | 6/2011 | Feaver et al. |
| 2011/0257453 A1* | 10/2011 | Chinta ................. B01J 8/02 585/435 |
| 2011/0312485 A1 | 12/2011 | Hashisho et al. |

FOREIGN PATENT DOCUMENTS

| | | |
|---|---|---|
| WO | WO2011023110 A1 | 3/2011 |
| WO | WO2012064702 A2 | 5/2012 |

OTHER PUBLICATIONS

Extended European Search Report in corresponding European application EP13855759.0 dated Apr. 3, 2017.

Examination Report in corresponding European application EP 13855759.0 dated Sep. 4, 2018.

* cited by examiner

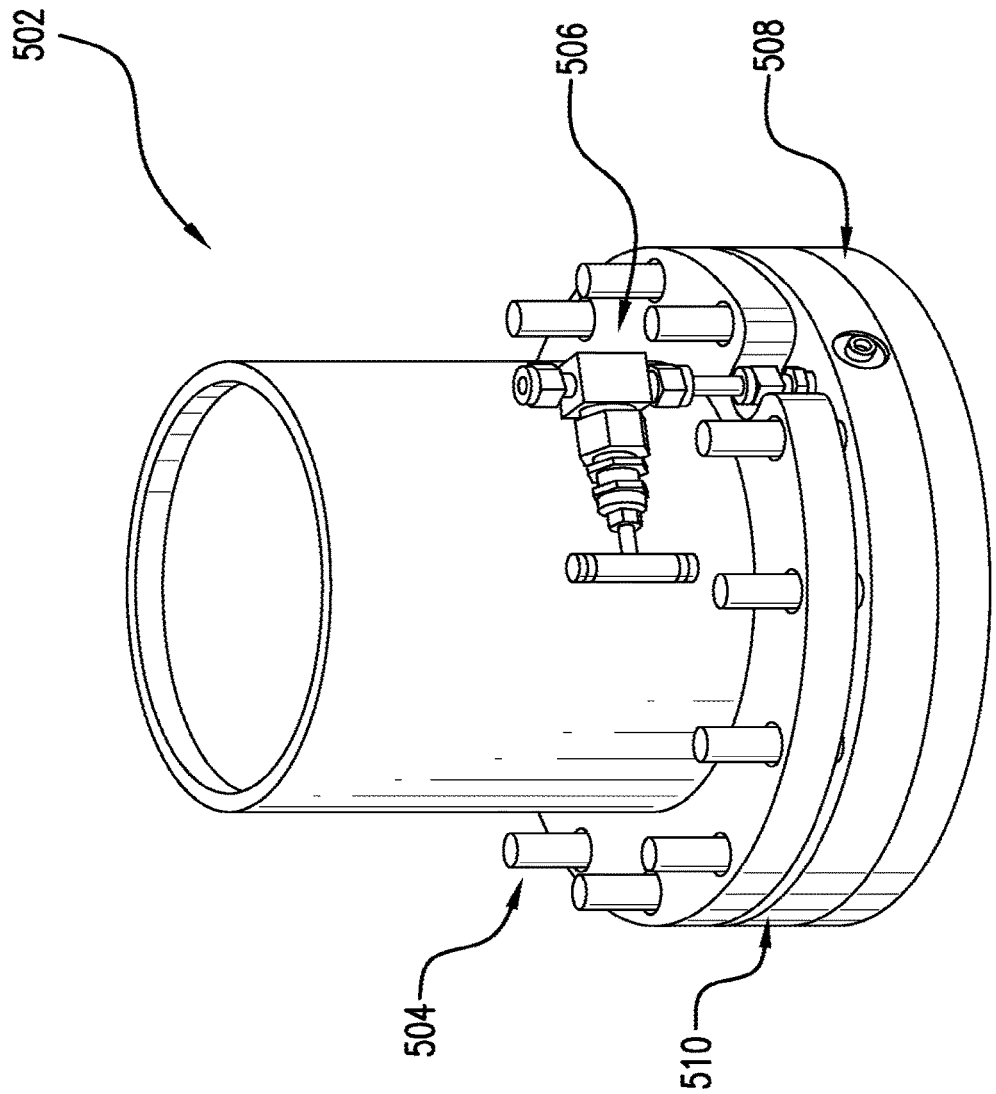

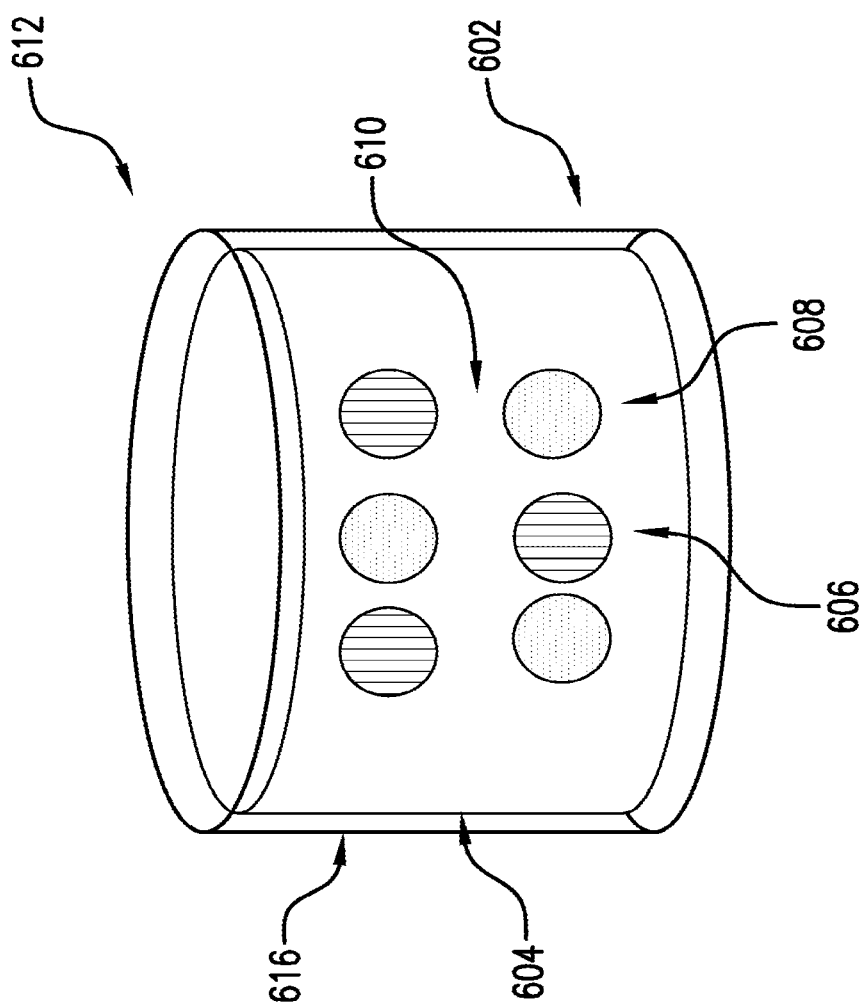

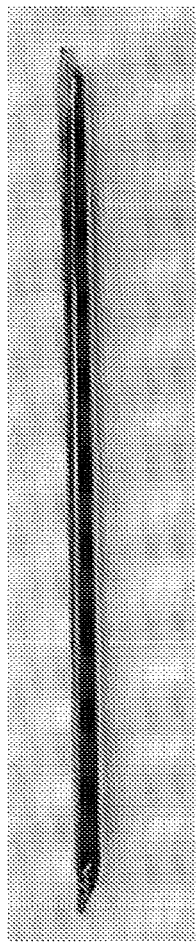

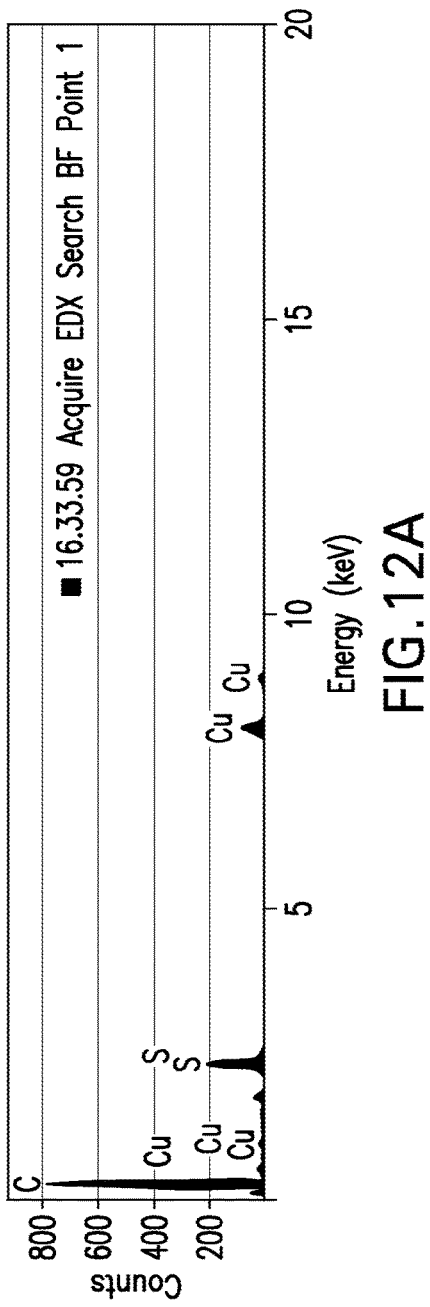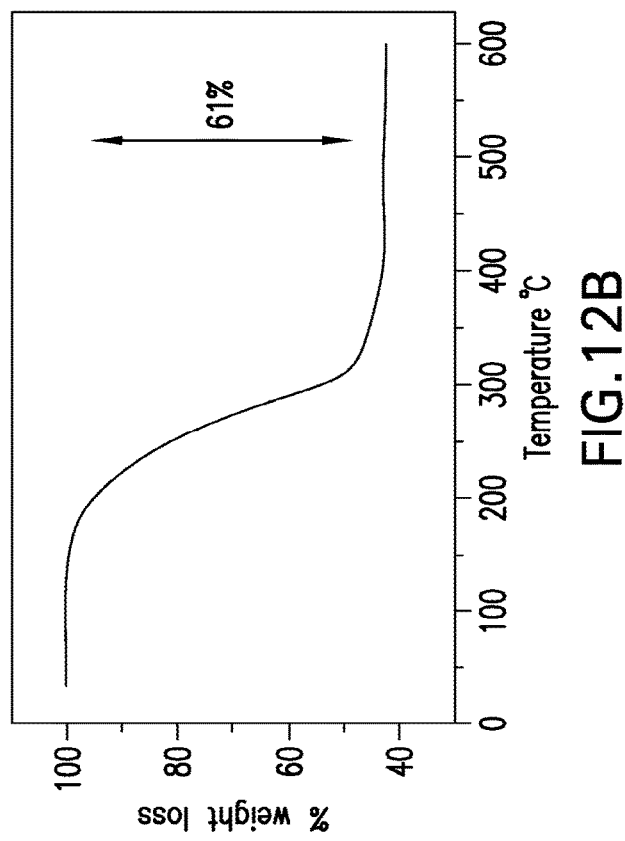
FIG. 12A
FIG. 12B

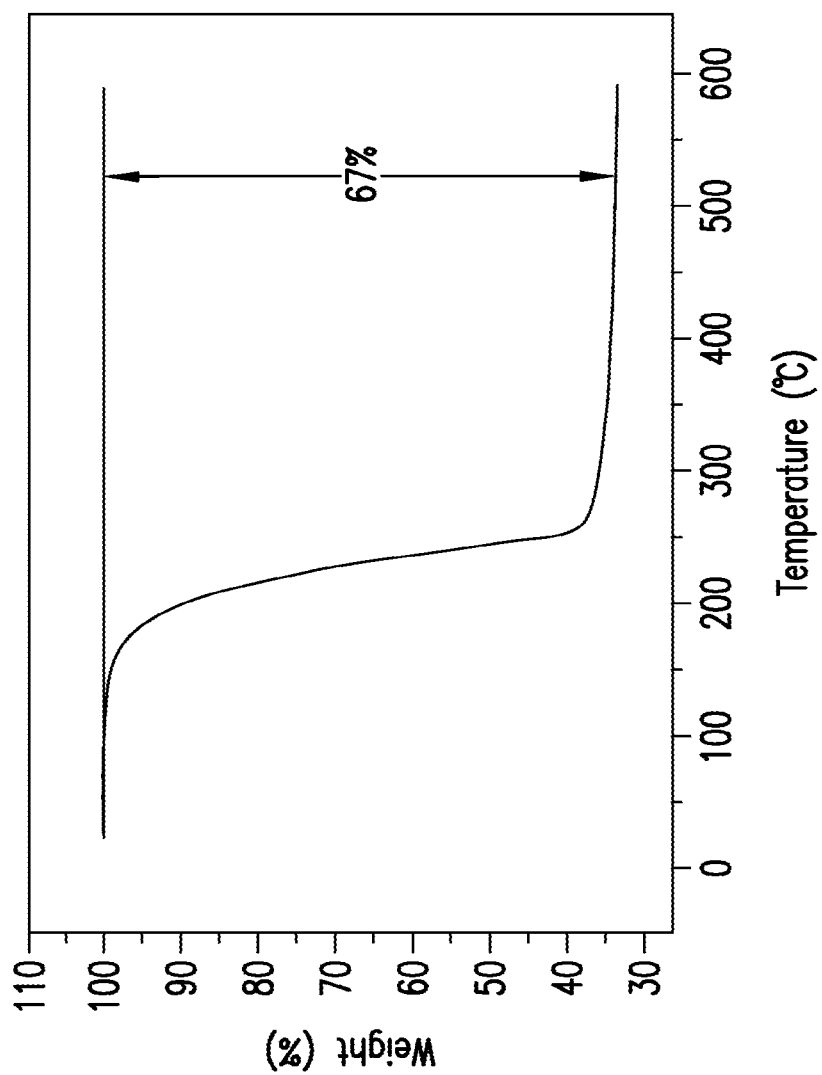

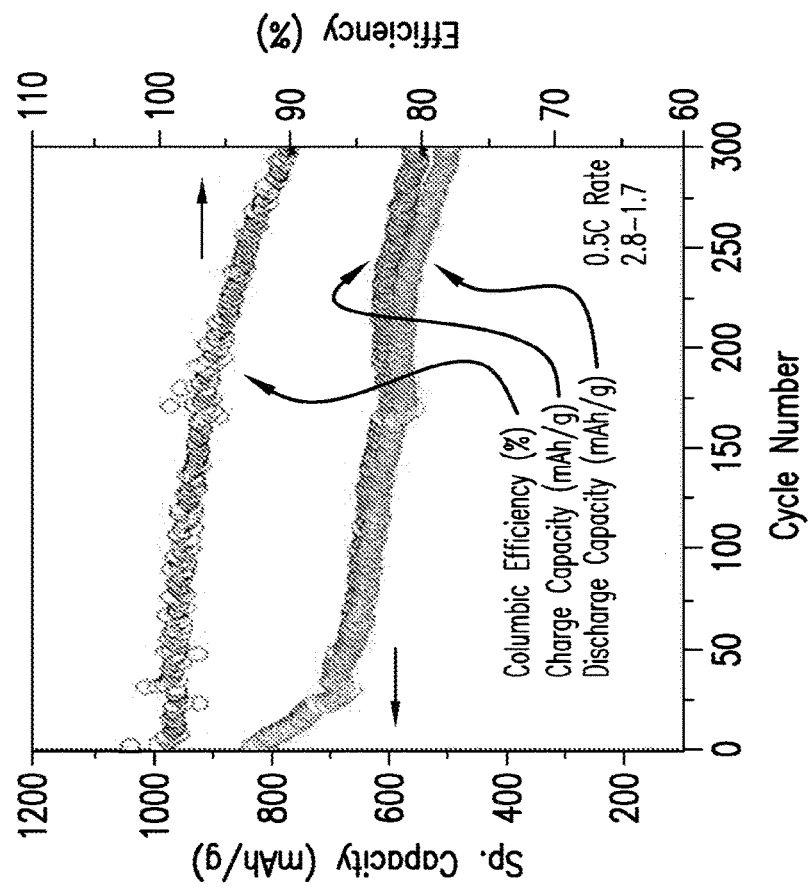
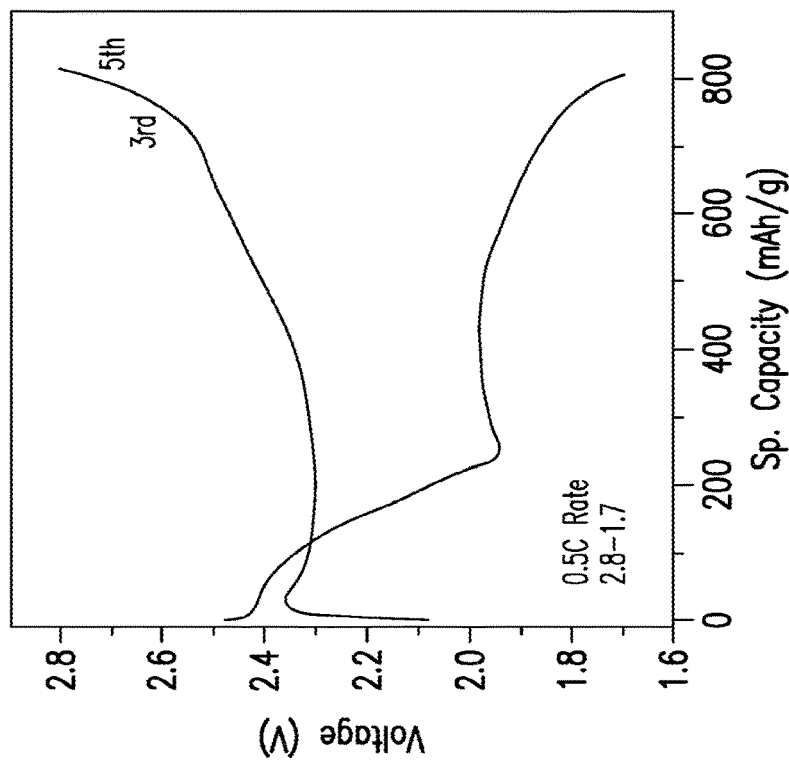
FIG. 19B
FIG. 19A

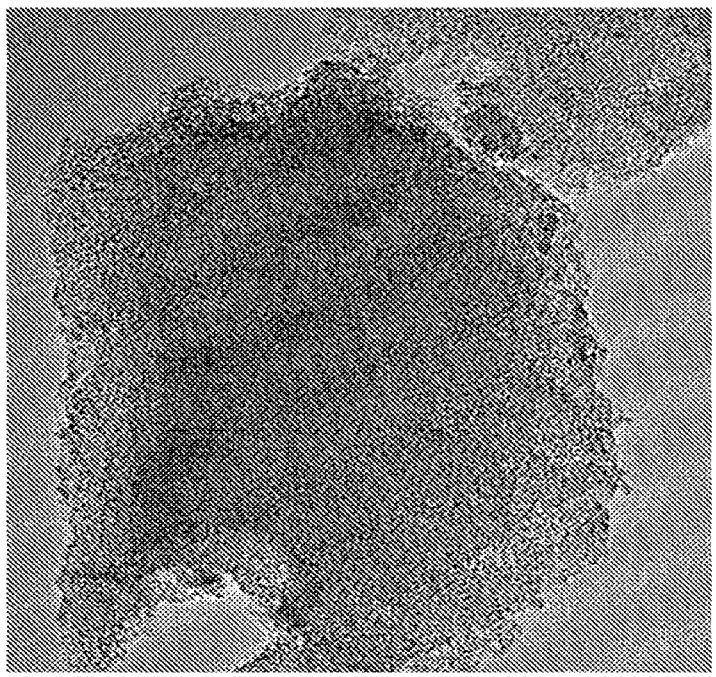
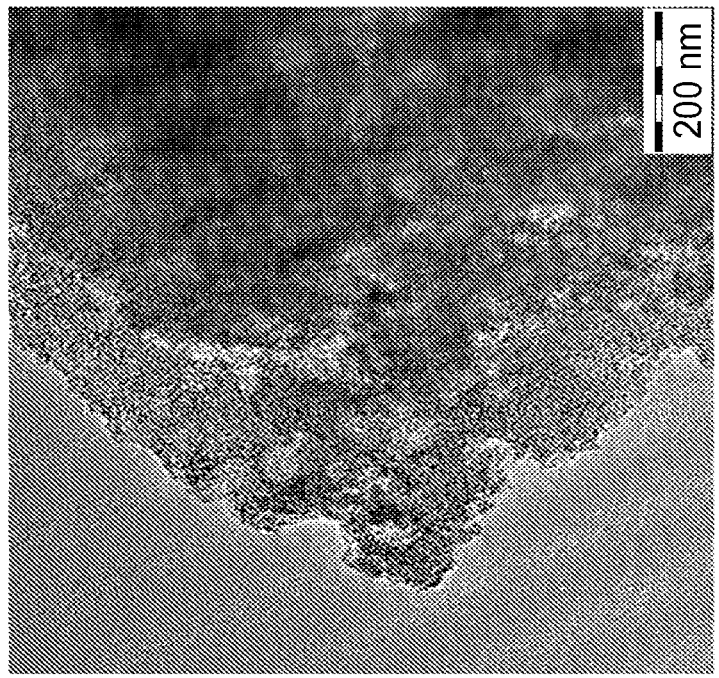

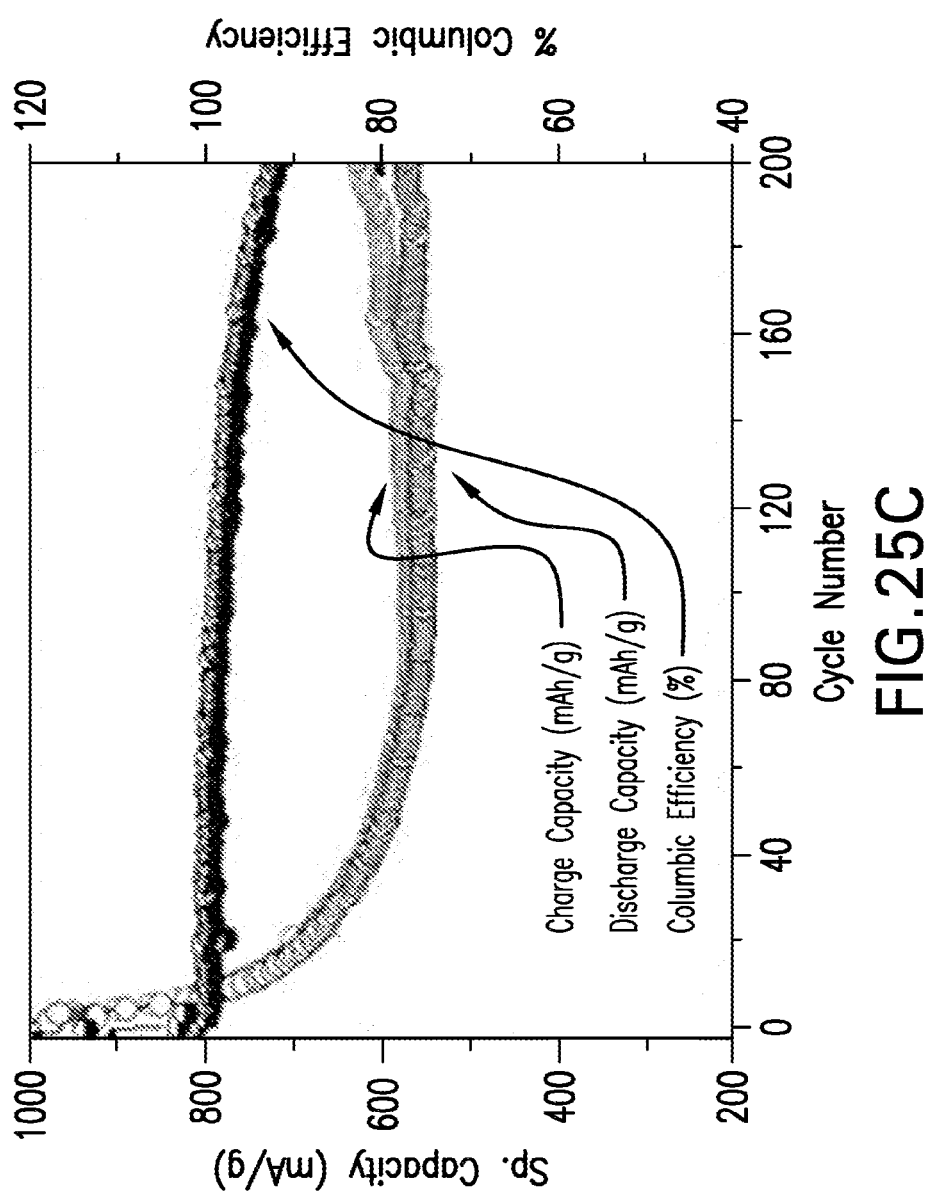

SULFUR-INFUSED CARBON FOR SECONDARY BATTERY MATERIALS

CROSS-REFERENCE TO RELATED APPLICATION

This application is a Divisional Application and claims the benefit of priority to U.S. application Ser. No. 14/083,764, now abandoned, filed Nov. 19, 2013, which itself claims the benefit of priority under 35 U.S.C. § 119(e) to U.S. Provisional Application No. 61/728,002, filed Nov. 19, 2012, and to Provisional Application No. 61/872,300, filed Aug. 30, 2013, the contents of which are incorporated by reference in their entirety.

STATEMENT REGARDING FEDERALLY SPONSORED RESEARCH OR DEVELOPMENT

This invention was made in part with government support under Grant No. IIP-1142767, awarded by National Science Foundation under a Small Business Innovation Research Phase I grant. The United States government has certain rights in this invention.

INCORPORATION BY REFERENCE

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

Embodiments relate generally to sulfur containing activated carbon and the use thereof as a cathode in a lithium ion secondary cell.

BACKGROUND

Among cathode materials for secondary lithium batteries, elemental sulfur has a very high theoretical capacity, 1672 mAhg$^{-1}$ against lithium, which is considerably greater than that of many commercially used transition metal phosphates and transition metal oxides. In addition, elemental sulfur also provides several other advantages as a cathode material for a secondary lithium battery, including in particular a low cost and a widespread availability. Sulfur has consequently been studied extensively as a cathode material for secondary lithium batteries and is considered a promising candidate for a cathode material for secondary lithium batteries that may be used in electric and hybrid electric vehicles.

Despite this promise, implementation of Li—S secondary battery systems for high power applications has been problematic for various reasons. For one, sulfur by itself has relatively low electrical conductivity. Thus, desirable are methods and materials that provide an opportunity to fully realize the advantages of sulfur as a cathode material within a Li—S secondary battery system.

Carbon, from sources such as coal, can be used to provide conductivity to materials, and has been used in lithium ion electrodes for this purpose.

While lithium sulfur (Li—S) cathode material has long enjoyed a significant (10x) specific capacity advantage over current lithium-ion batteries, Li—S chemistries have been impractical due to poor cycle life and a high rate of discharge. The polysulfide shuttling reaction between sulfur and its lithiated compounds has limited the development of batteries based on the Li—S chemistry because the reaction leads to irreversible material losses in the battery that reduces energy storage capacity over time. Shuttling is a cyclic process in which long-chain lithium polysulfides, (Li$_2$S., 2<n<8), generated at the cathode during charging, dissolve into the electrolyte and migrate to the anode by diffusion where they react with the lithium electrode in a parasitic fashion to generate lower-order polysulfides, which diffuse back to the sulfur cathode and regenerate the higher forms of polysulfide. Since this polysulfide shuttling or dissolution takes place at the expense of the available electroactive sulfur species, the reversibility of sulfur and/or sulfide is broadly considered a major technical barrier towards commercialization of high-energy Li—S batteries. Another limitation is elemental sulfur is a poor electrical conductor (with a conductivity z 5×10$^{-30}$ S cm$^{-1}$ at 25° C.), which has limited the rate at which a conventional Li—S battery can be discharged/charged.

Thus, there remains a need for sulfur-containing cathode materials for lithium secondary cell with improved conductivity and cycle life.

SUMMARY

Described herein are methods for producing sulfur-infused carbonaceous material as a cathode material for use in a Li—S battery. In some embodiments, elemental sulfur and a carbonaceous material are premixed before heating and the mixed sulfur and the carbonaceous material are heated to a temperature from about 445° C. to about 1000° C. for a period of time and under a pressure greater than 1 atm to generate a sulfur vapor to infuse the carbonaceous material with sulfur to result in a sulfur-infused carbonaceous material. Because elemental sulfur and the carbonaceous material are premixed, the elemental sulfur and the carbonaceous material are heated to the same temperature. In certain embodiments, the sulfur-infused carbonaceous material produced using method as described herein comprises more than 50 wt % of sulfur after a single heating operation.

In some embodiments, a low-cost, efficient method of achieving sulfur-containing high-surface area, high-conductivity carbon derived from bulk coal (i.e. activated carbon) for lithium secondary cell applications is provided.

Sulfur containing carbon and methods of production thereof from coal are described for lithium secondary cell applications. The disclosure reports a high-energy density, low-cost rechargeable lithium sulfur battery technology.

In one aspect, a method of producing an cathode material for use in a Li—S battery includes providing activated coal having a heavy metal ion impurity of less than 100 ppm and a surface area greater than 1000 m$^2$/g; mixing elemental sulfur with the activated coal; and heating the mixed sulfur and activated coal to infuse the coal with at least 60 wt % sulfur in a single heating operation.

In one or more embodiments, providing activated coal includes purifying coal to contain less than 100 ppm of heavy ion impurities; activating coal by heating a mixture of the purified coal and a base; and sintering the activated coal at a temperature in there range of 900° C.-1300° C. to provide an activated coal having a surface area greater than 1000 m$^2$/g.

Also described herein are reactors for producing a sulfur-infused carbonaceous material as a cathode material for use in a Li—S battery, including a pressure-resistant reactor body and an inner sulfur-resistant layer at the inner surface of the reactor. Li—S batteries containing sulfur-infused carbonaceous materials produced as described herein are also described. The disclosure reports a high-energy density, low-cost rechargeable lithium sulfur battery technology.

In one aspect, a method of producing a sulfur-infused carbonaceous material as a cathode material for use in a Li—S battery is described, including:

providing a carbonaceous material;

mixing elemental sulfur with the carbonaceous material; and heating the mixed sulfur and the carbonaceous material at a temperature from about 445° C. to about 1000° C. for a period of time and under a pressure greater than 1 atm to generate a sulfur vapor to infuse the carbonaceous material with sulfur to result in a sulfur-infused carbonaceous material.

In any one of the embodiments disclosed herein, the sulfur-infused carbonaceous material includes from about 10 wt % to about 99 wt % of sulfur after a single heating operation.

In any one of the embodiments disclosed herein, the sulfur-infused carbonaceous material includes more than 50 wt % of sulfur after a single heating operation.

In any one of the embodiments disclosed herein, the sulfur-infused carbon includes more than 60 wt %, 65 wt %, 70 wt %, 75 wt %, 80 wt %, 85 wt %, 90 wt %, 95 wt %, or 97 wt % of sulfur after a single heating operation.

In any one of the embodiments disclosed herein, the method further includes cooling the heated mixed sulfur and the carbonaceous material.

In any one of the embodiments disclosed herein, the method further includes cooling the heated mixed sulfur and the carbonaceous material to room temperature.

In any one of the embodiments disclosed herein, the period is about 1 minute, 10 minutes, 30 minutes, 1 h, 2 h, 3 h, or 4 h.

In any one of the embodiments disclosed herein, the carbonaceous material is selected from the group consisting of coal, polyacrylonitrile, resorcinol-formaldehyde resins, KetJen, aerogel, coconut, bamboo, plant derived carbon, CNT, graphene, acetylene black, Super P and a combination thereof.

In any one of the embodiments disclosed herein, providing a carbonaceous material further includes activating the carbonaceous material.

In any one of the embodiments disclosed herein, activating the carbonaceous material includes using a base selected from the group consisting of KOH, NaOH, LiOH, and combinations thereof.

In any one of the embodiments disclosed herein, the activated carbonaceous material has a surface area greater than about 1000 $m^2/g$.

In any one of the embodiments disclosed herein, the temperature is from about 450° C. to about 900° C., from about 500° C. to about 800° C., from about 500° C. to about 700° C., or from about 500° C. to about 600° C.

In any one of the embodiments disclosed herein, the temperature is about 550° C.

In any one of the embodiments disclosed herein, the pressure is about 2 atm, about 3 atm, about 5 atm; about 10 atm, about 20 atm, about 25 atm, about 50 atm, about 100 atm, or about 150 atm.

In any one of the embodiments disclosed herein, the temperature is about 500° C. and the pressure is about 2.05 atm.

In any one of the embodiments disclosed herein, the temperature is about 750° C. and the pressure is about 25.4 atm.

In any one of the embodiments disclosed herein, the temperature is about 1000° C. and the pressure is about 144.5 atm.

In any one of the embodiments disclosed herein, providing a carbonaceous material includes providing and activating coal.

In any one of the embodiments disclosed herein, the activated coal has a heavy metal ion impurity of less than 100 ppm and a surface area greater than 1000 $m^2/g$;

In any one of the embodiments disclosed herein, providing and activating coal includes:

purifying coal to contain less than 100 ppm of heavy ion impurities;

activating coal by heating a mixture of the purified coal and a base; and sintering the activated coal at a temperature in the range of 900° C.-1300° C. to provide an activated coal having a surface area greater than 1000 $m^2/g$.

In any one of the embodiments disclosed herein, the purification includes: treating coal with leaching solution containing acids, oxidizers, and water; and washing the coal with water to remove impurities.

In any one of the embodiments disclosed herein, the activation step comprises heating to temperatures between 500 and 900° C.

In any one of the embodiments disclosed herein, the method further includes pulverizing the coal.

In any one of the embodiments disclosed herein, the method further includes heating to a temperature of 900° C. for 8 to 10 hours prior to pulverizing.

In any of the preceding embodiments, heating the mixed sulfur and activated coal includes heating to temperatures between 300° C. and 1000° C.

In any one of the embodiments disclosed herein, purifying coal includes using an acid selected from the group consisting of HCl, H2SO4, HNO3, and combinations thereof.

In any one of the embodiments disclosed herein, activating coal includes using a base selected from the group consisting of KOH, NaOH, LiOH, and combinations thereof.

In any one of the embodiments disclosed herein, sintering includes using a gas environment selected from the group consisting of $N_2$, CO2, Ar, He, $H_2$, CO, $NO_x$, and combinations thereof.

In any one of the embodiments disclosed herein, the method includes providing activated coal having a surface area between 1000 and 2000 $m^2/g$.

In any one of the embodiments disclosed herein, providing a carbonaceous material includes providing activated carbonaceous material having graphitic content between 1 and 20 mass %.

In any one of the embodiments disclosed herein, providing a carbonaceous material comprises providing activated carbonaceous material having graphitic content between 5 and 10 mass %.

In any one of the embodiments disclosed herein, the sulfur-infused carbon includes 60 wt % and 95 wt % sulfur after in a single heating operation.

In another aspect, a Li—S battery is described, including:

a cathode comprising a sulfur-infused carbonaceous material made by the method of any of the preceding embodiments;

an electrolyte; and a lithium-containing anode.

In yet another aspect, a Li—S battery is described, including:

a cathode comprising a coal-sulfur composite, the composite comprising activated coal having a heavy metal ion impurity of less than 100 ppm, a surface area greater than 1000 m$^2$/g and at least 60 wt % sulfur;

an electrolyte; and a lithium anode.

In any one of the embodiments disclosed herein, the electrolyte comprises a thermally stable ionic liquid, lithium salt, and aprotic solvent.

In any one of the embodiments disclosed herein, the battery includes activated coal having a surface area between 1000 and 2000 m$^2$/g.

In any one of the embodiments disclosed herein, the battery of any one of claims 32-35 wherein initial battery capacity is between 400 and 1200 mAh/g.

In any one of the embodiments disclosed herein, the initial battery capacity is between 700 and 1000 mAh/g.

In one or more embodiments, the battery including activated coal having graphitic content between 1 and 20 mass %.

In one or more embodiments, the battery including activated coal having graphitic content between 5 and 10 mass %.

In yet another aspect, a reactor for producing a sulfur-infused carbonaceous material as a cathode material for use in a Li—S battery is described, including:

a reactor body configured to withstand a pressure from about 1 atm to about 150 atm; and an inner sulfur-resistant layer at the inner surface of the reactor body, wherein the inner layer is inert to sulfur vapor at a temperature from about 450° C. to about 1000° C.

In any one of the embodiments disclosed herein, the reactor body and the inner layer are made of the same material.

In any one of the embodiments disclosed herein, the material withstands a pressure from about 1 atm to about 150 atm and is layer is inert to sulfur vapor at a temperature from about 450° C. to about 1000° C.

In any one of the embodiments disclosed herein, the material is selected from the group consisting of titanium, molybdenum, Tungsten and a combination thereof.

In any one of the embodiments disclosed herein, wherein the reactor body and the inner layer are made of different materials.

In any one of the embodiments disclosed herein, the reactor body is made of a material selected from the groups consisting of titanium, molybdenum, Tungsten, stainless steel, and a combination thereof.

In any one of the embodiments disclosed herein, the inner layer is made of a material selected from the group consisting of titanium, molybdenum, Tungsten, quartz, alumina, silicon carbide, Nucerite 7040 (Pfaudler), Nitraglass 6510 (Pfaudler), SiO$_2$, and a combination thereof.

In any one of the embodiments disclosed herein, the inner layer is a sheath or liner configured to slide in and out of the reactor body.

In any one of the embodiments disclosed herein, the inner layer is a coating coated on the inner surface of the reactor body.

It is contemplated that any embodiment disclosed herein may be properly combined with any other embodiment disclosed herein. The combination of any two or more embodiments disclosed herein is expressly contemplated.

BRIEF DESCRIPTION OF THE DRAWINGS

The invention is described with reference to the following figures, which are presented for the purpose of illustration only and are not intended to be limiting. In the Drawings:

FIG. 5 is a drawing of an exemplary reactor for producing sulfur-vapor-infused carbonaceous material according to one or more embodiments.

FIGS. 6A and 6B are schematics of exemplary reactors for producing sulfur-vapor-infused carbonaceous material according to one or more embodiments in which: FIG. 6A shows a reactor body with a coated inner layer on its inside surface or the reactor body and the inner layer forms the unitary body of the reactor; FIG. 6B shows a reactor body with a liner or a sheath.

FIG. 7 is a photograph of a sulfur infusion glass reactor containing sulfur mixed activated coal according to one or more embodiments.

FIG. 12A shows elemental composition of a representative lab scale S @ C composites analyzed by energy-dispersive X-ray (EDX) microanalysis; FIG. 12B shows the Thermo Gravimetric Analysis plot for this S @ C sample shown in FIG. 12A).

FIG. 13A Voltage vs. capacity FIG. 13B galvanostatic profile of Li—S @ C battery under the potential window 3.1-1.7 V and at 0.2 C rate (lab-scale material).

FIG. 17 shows the Thermo Gravimetric Analysis (TGA) recorded for a S @ C composite displaying the presence of 67% sulfur in the composite.

FIGS. 19A and 19B shows: FIG. 19A Voltage vs. capacity profile and FIG. 19B Cycle life behavior of Li—S battery assembled with a S @ C composite in Example 5 at 0.5 C current rate under the potential window 1.7-2.8V.

FIGS. 22A and 22B shows the TEM images of the FIG. 22A activated commercial coconut carbon and FIG. 22B after sulfur infusion in the titanium reactor.

FIGS. 25A-25C shows the electrochemical discharge and charge of the titanium Li—S batteries at 0.2 and 1 C current rates: FIG. 25A Voltage vs. capacity profile and FIG. 25B Cycle life behavior of Li—S battery assembled with the S @ C composite at 0.2 C and FIG. 25C 1 C current rate under the potential window 1.7-2.8V. The capacity is reported here in terms of the percentage (69%) of the sulfur active mass.

DETAILED DESCRIPTION

Figure 1:
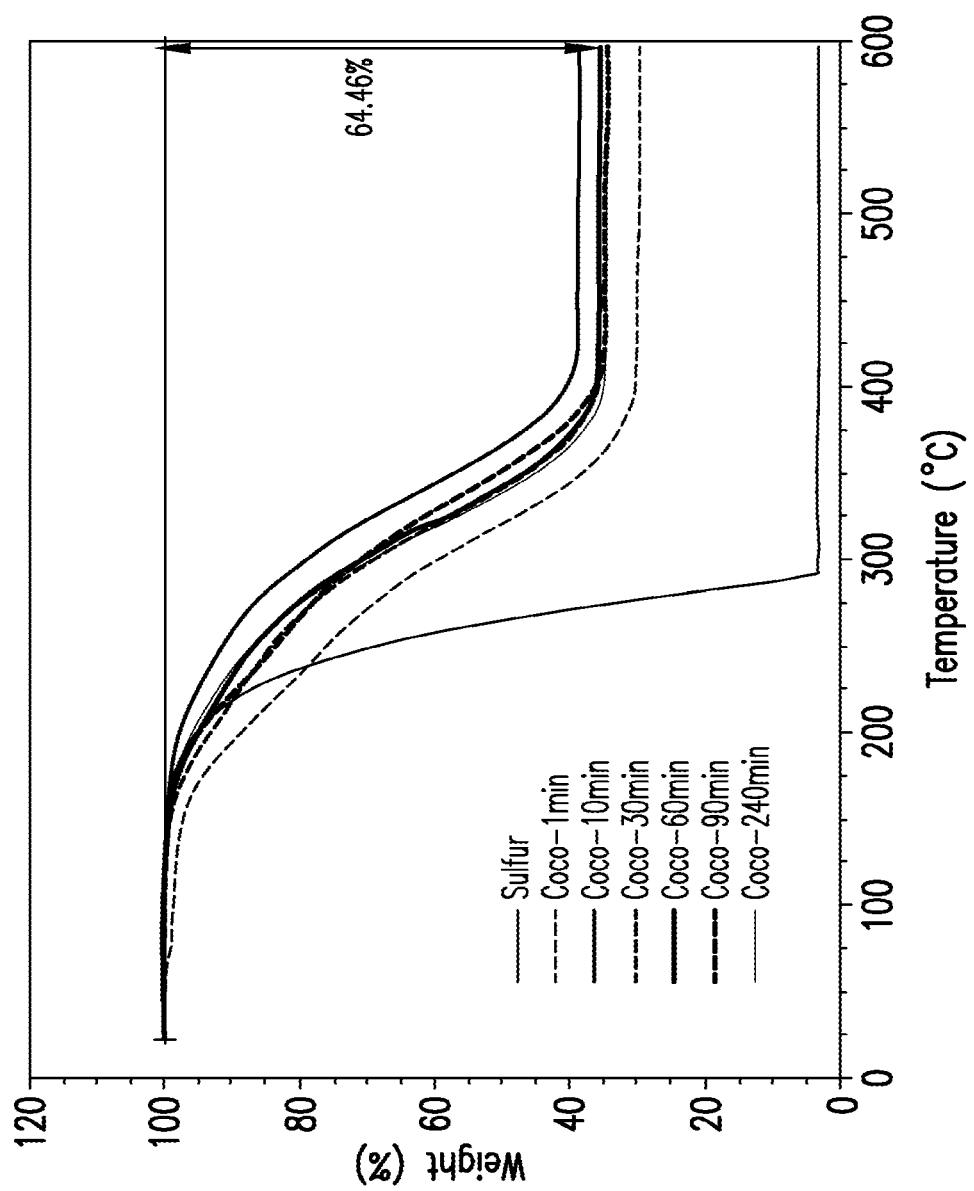
FIG. 1 illustrates the weight percentages of sulfur incorporated into coconut carbon under different heating time analyzed by TGA experiments according to one or more embodiments.

Described herein are methods for producing sulfur-infused carbonaceous material as a cathode material for use in a Li—S battery and reactors for producing such sulfur-infused carbonaceous material. Also described herein are high-energy density, low-cost rechargeable lithium sulfur batteries including the sulfur-infused carbonaceous materials.

Methods

In one aspect, a method for producing a sulfur-infused carbonaceous material for use in Li—S batteries is described. In some embodiments, a carbonaceous material is first provided and then premixed with elemental sulfur. The carbonaceous material may be selected from the group consisting of coal, polyacrylonitrile, resorcinol-formaldehyde resins, KetJen, aerogel, coconut, bamboo, plant derived carbon, CNT, araphene, acetylene black, Super P and a combination thereof. Other carbonaceous materials known in the art may also be used.

In some embodiments, elemental sulfur and a carbonaceous material are premixed before heating. The mixed sulfur and the carbonaceous material are then heated to the temperature in the range of from about 445° C. to about 1000° C. for a period of time and under a pressure greater than 1 atm to generate a sulfur vapor. Because the element sulfur and the carbonaceous material are mixed prior to heating, the element sulfur and the carbonaceous material are naturally heated to the same temperature to generate the sulfur vapor. In certain embodiments, the temperature is from about 450° C. to about 900° C., from about 500° C. to about 800° C., from about 500° C. to about 700° C., or from about 500° C. to about 600° C. In certain specific embodiments, the temperature is about 550° C.

In some embodiments, the method described herein is carried out under the pressure of about 2 atm, about 3 atm, about 5 atm; about 10 atm, about 20 atm, about 25 atm, about 50 atm, about 100 atm, or about 150 atm. In some embodiments, the pressure during the sulfur-infusion is about 1 atm to about 2 atm, about 1 atm to about 5 atm, about 2 atm to about 3 atm, about 2 atm to about 5 atm, about 1 atm to about 10 atm, about 1 atm to about 20 atm, about 1 atm to about 30 atm, about 1 atm to about 50 atm, about 1 atm to about 100 atm, about 10 atm to about 20 atm, about 10 atm to about 30 atm, about 10 atm to about 40 atm, about 10 atm to about 50 atm, about 10 atm to about 100 atm, about 20 atm to about 30 atm, about 20 atm to about 40 atm, about 20 atm to about 50 atm, about 20 atm to about 100 atm, about 30 atm to about 40 atm, about 30 atm to about 50 atm, about 30 atm to about 100 atm, about 40 atm to about 50 atm, about 40 atm to about 100 atm, or about 50 atm to about 100 atm. In some other embodiments, the pressure during the sulfur-infusion is about 100 atm to about 150 atm. In some embodiments, the pressure during the sulfur-infusion is determined by the vapor pressure of the sulfur. In certain embodiments, the method including heating the element sulfur at about 500° C. and the pressure under which the sulfur-infusion is carried out is about 2.05 atm. In certain embodiments, the method including heating the element sulfur at about 750° C. and the pressure under which the sulfur-infusion is carried out is about 25.4 atm. In certain embodiments, the method including heating the element sulfur at about 1000° C. and the pressure under which the sulfur-infusion is carried out is about 144.5 atm.

In certain embodiments, the mixture of element sulfur and the carbonaceous material is heated for about 1 minute, 10 minutes, 30 minutes, 1 h, 2 h, 3 h, or 4 h. In certain embodiments, the sulfur infusion can be achieved efficiently within minutes, e.g., 1 min or 10 mins and prolonged heating does not improve the weight of sulfur incorporated into the carbon (FIG. 1). As FIG. 1 illustrates, premixed element sulfur and coconut were heated for 1 minute, 10 minutes, 30 minutes, 1 h, 1.5 h, or 4 h. Thermogravametric analysis of the resulting product was conducted; the weight loss is associates with the amount of sulfur in the composite material due to the high volatility of sulfur. The TGA analysis showed that in all cases the more than 60 wt % of sulfur was incorporated into the carbonaceous material.

The carbonaceous material may be activated first to increase its surface area carbonaceous material. In certain embodiments, the carbonaceous material is treated with a base under heating to activate the carbonaceous material. The base may be an inorganic base selected from the group consisting of KOH, NaOH, LiOH, and a combination thereof. In the activation step, the mixture of the base and the carbonaceous material is heated to a temperature from about 450° C. to about 900° C., from about 500° C. to about 800° C., from about 500° C. to about 700° C., or from about 500° C. to about 600° C.

The process of activation may also further include purifying the carbonaceous material and/or sintering the carbonaceous material. The carbonaceous material may be washed with an acid to remove impurities, e.g., heavy-metal ions. The acid may be selected from the group consisting of HC1, H2SO4, HNO3, and combinations thereof. In certain embodiments, after the purification step, the heavy metal ion impurity in the carbonaceous material is less than about 100 ppm, about 50 ppm, about 30 ppm, about 20 ppm, or about 10 ppm.

The activated carbonaceous material may be further sintered by a temperature in the range of 900° C.-1300° C. to provide an activated carbonaceous material having a specific surface area greater than about 1000 $m^2/g$. In some embodiments, the resulting activated carbonaceous material has a specific surface area of greater than about 1000 $m^2/g$, about 1100 m²/g, about 1200 m²/g, about 1300 m²/g, about 1400 m²/g, about 1500 m²/g, about 1600 m²/g, about 1700 m²/g, about 1800 m²/g, about 1900 m²/g, about 2000 m²/g, about 2100 m²/g, about 2200 m²/g, or about 2500 m²/g. In certain embodiments, the resulting activated carbonaceous material has a specific surface area between about 1000 m²/g and about 2000 m²/g. In certain embodiments, the activated carbonaceous material has a graphitic content between 1 and 20 mass % or between 5 and 10 mass %.

Figure 2:
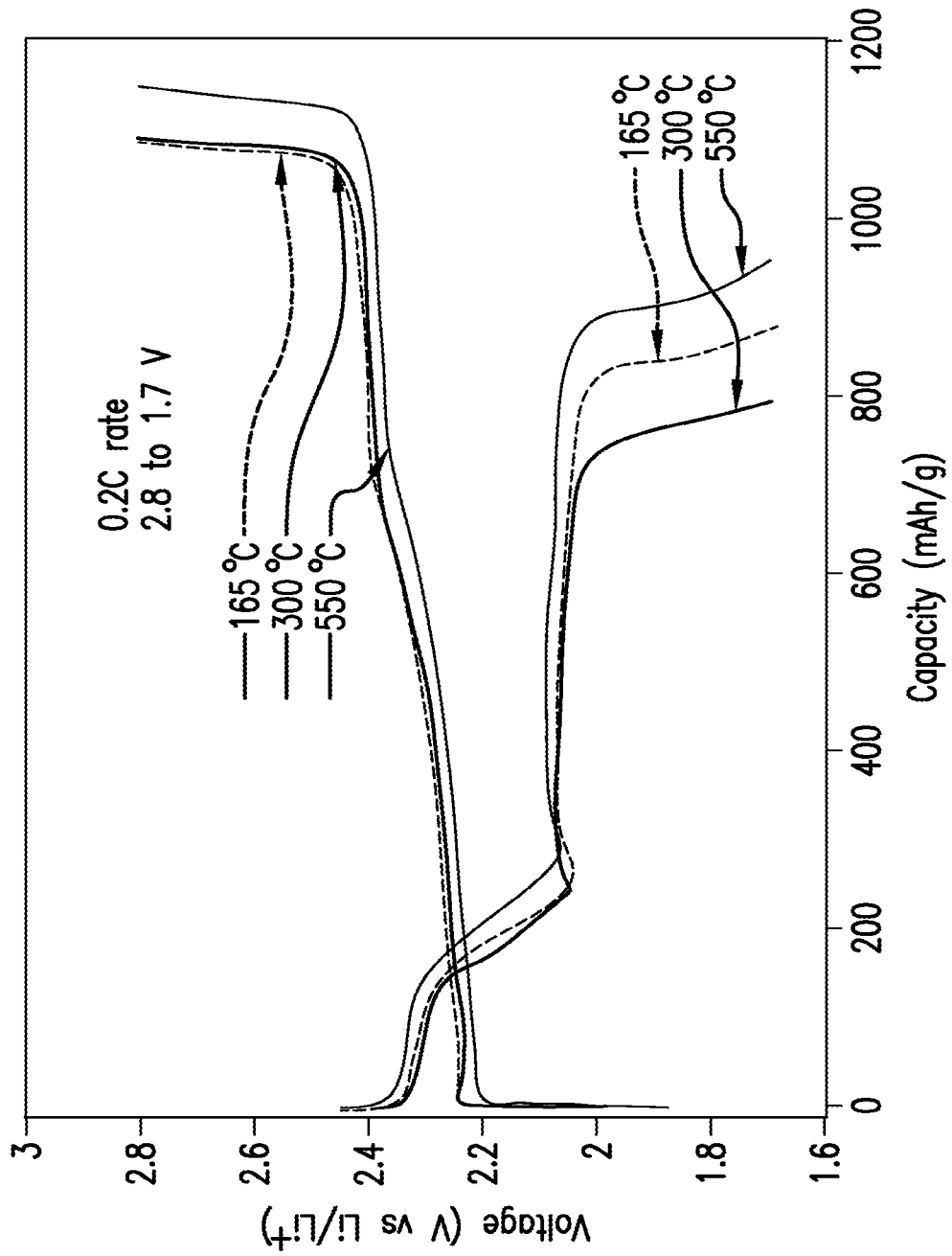
FIG. 2 illustrates the capacities of sulfur-infused KetJen black materials produced under heating the sulfur at 165° C., 300° C., and 550° C.
Figure 3:
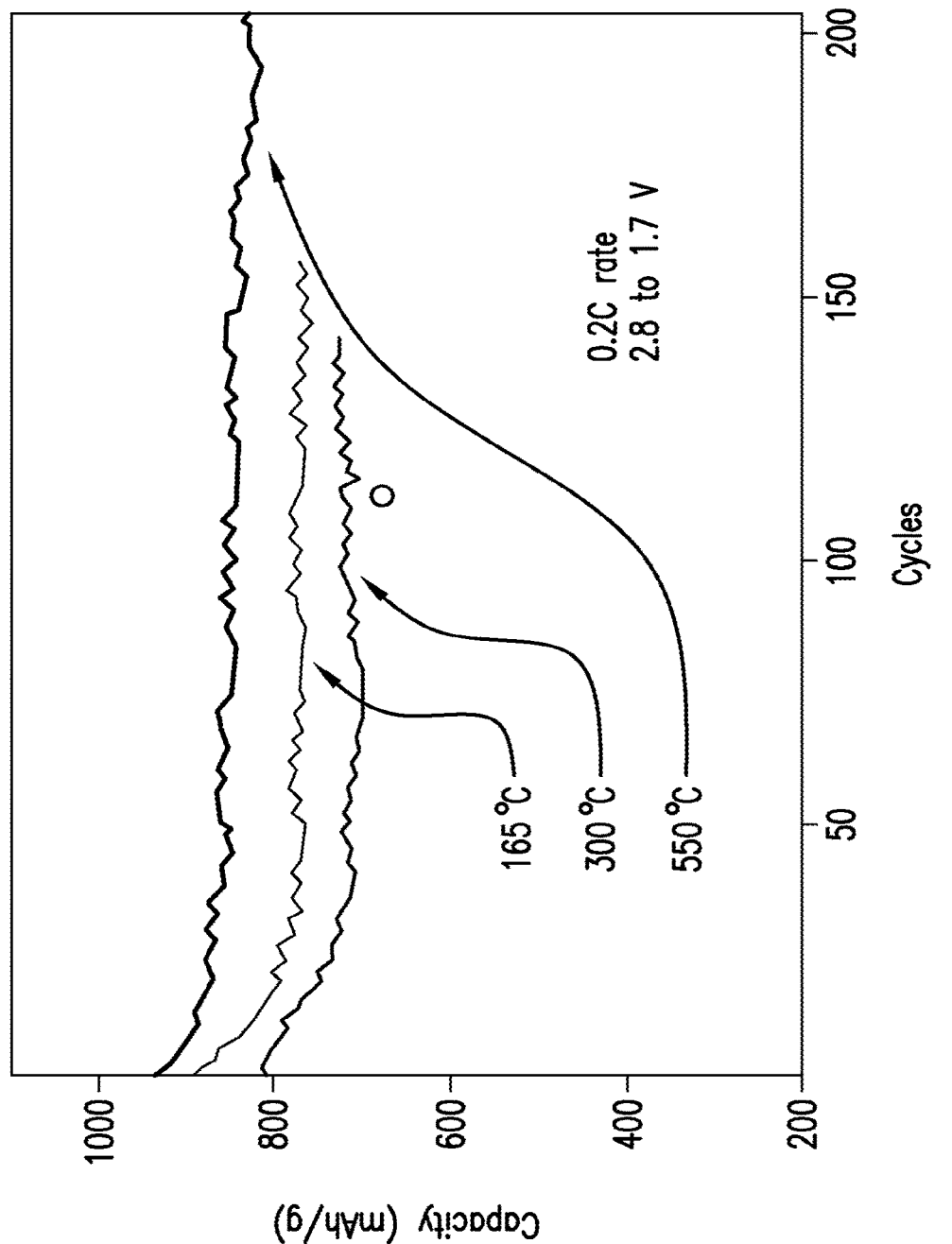
FIG. 3 illustrates the capacities of sulfur-infused KetJen black materials produced under heating the sulfur at 165° C., 300° C., and 550° C. after a plurality of cycles.

The methods disclosed herein enable the production of sulfur-vapor-infused carbonaceous material with high efficiency and ease. First, unlike other methods known in the field which use low temperature sulfur sublimation or liquid sulfur, the method disclosed herein heat the sulfur above its boiling point to generate sulfur vapor that can be infused rapidly and at high sulfur content into the carbonaceous material. Applicants have surprisingly found that when the sulfur vapor is used, the resulting sulfur-infused carbonaceous material has superior capacity and cyclability. As shown in FIGS. 2 and 3, KetJen black material was infused with sulfur at three different heating temperatures, e.g., 165° C. (infusion with liquid sulfur), 300° C. (infusion with liquid sulfur), and 550° C. (infusion with sulfur vapor). The results indicated that sulfur-vapor infusion, i.e., when sulfur was heated to about 550° C. (above its melting boiling point), the resulting sulfur-vapor-infused KetJen black had the most capacity (FIG. 2). Additionally, sulfur-vapor-infused KetJen black exhibited excellent cyclability and maintained capacity superior to the KetJen black with sulfur infused at 165° C. or 300° C. (FIG. 3). These results indicate that vapor phase infusion is superior compared to melt phase by allowing sulfur to penetrate into the interiors of the mesoporous or nano-porous carbon matrix. Without wishing to be bound by a particular theory, it is believed that in the case of melt phase infusion (165 and 300° C.), liquid sulfur may not be able to penetrate deep into the carbon pores due to the capillary forces. These results may be explained by the fact that liquid sulfur viscosity decreases till 165° C. and increases rapidly with temperature due to polymerization of the sulfur molecules. On the other hand, sulfur infusion above its boiling point utilizes sulfur vapor to efficiently infuse the meso or nano pores of the carbonaceous material and thus is significantly more efficient.

Second, unlike other methods known in the field which require the separation of the carbon and sulfur prior to heating, the method disclosed herein allows the premix of element sulfur and the carbonaceous material, thus reducing the complexity of the operation. Additionally, other sulfur-vapor-infusion method known in the field generally requires that the sulfur is heated, separately from the carbon, to a temperature higher than the temperature of the carbon to allow the sulfur to condense on the cooler carbon. Applicants have surprisingly found that efficient sulfur-infusion by sulfur vapor can be achieved by heating the premixed sulfur and carbonaceous material to a common temperature from about 445° C. to about 1000° C. followed by cooling the mixture to allow sulfur to be infused into the carbonaceous material. Without wishing to be bound to any particular theory, it is believed that the affinity of carbon towards sulfur contributes to the efficient sulfur incorporation into the carbonaceous material in the methods as described herein.

The method as disclosed herein results in highly efficient sulfur incorporation where more than 50 wt % of sulfur-incorporation is achieved after a single heating operation. In some embodiments, more than 60 wt %, 65 wt %, 70 wt %, 75 wt %, 80 wt %, 85 wt %, 90 wt %, 95 wt %, or 97 wt % of sulfur-incorporation is achieved after a single heating operation. In some embodiments, about 66 wt % to about 70 wt % of sulfur-incorporation is achieved after a single heating operation. The wt % is measure by the percentage of sulfur weight of the total weight of the sulfur-infused carbonaceous material.

In some embodiments, the carbonaceous materials are developed from inexpensive and abundant feedstock. In certain embodiments, the carbonaceous material is amorphous carbon such as coal which can be processed into high surface area carbon through pyrolysis and activation and finds its principal use in absorption and filtration. Carbon in the form of crystalline graphite possesses a combination of properties including lubricity, refractoriness, chemical inertness, as well as thermal and electrical conductivity. However, it is a challenge to obtain a material having both high surface area and high graphitic content, as would be required for use in batteries, as the high temperature sintering processes used to enhance graphitic content tends to reduce surface area.

Batteries, and in particular, lithium ion batteries are sensitive to impurities. In particular, metallic ion impurities can degrade the performance of the lithium ion batteries. Coal, having metallic impurities and in particular heavy metal impurities is not considered to be a suitable source for battery materials.

In one or more embodiments, the material is produced by activating coal to create high surface area, high graphitic content activated coal (i.e. activated carbon). In exemplary embodiments, the activated coal has a surface area of greater than 1200 m²/g and a graphitic content of at least 10% by weight. In addition, the metal ion impurities and in particular the heavy metal ion impurities are typically less than 100 ppm.

A process for preparing a Li—S secondary battery from low cost materials is described. The process includes providing a high surface area, high graphitic content activated coal with a heavy metals impurity content of typically less than 100 ppm and infusing the activated coal with sulfur in a single step process. The process thereby provides a material suitable for use in Li—S batteries using low cost starting materials and minimal processing steps.

A process for obtaining a high surface area, high graphitic content activated coal with a heavy metals impurity content of typically less than 100 ppm is described. Several steps are involved in synthesizing activated carbon from anthracite coal. Other coal sources can also be used (e.g., Lignite, bituminous, subbituminous).

Figure 4:
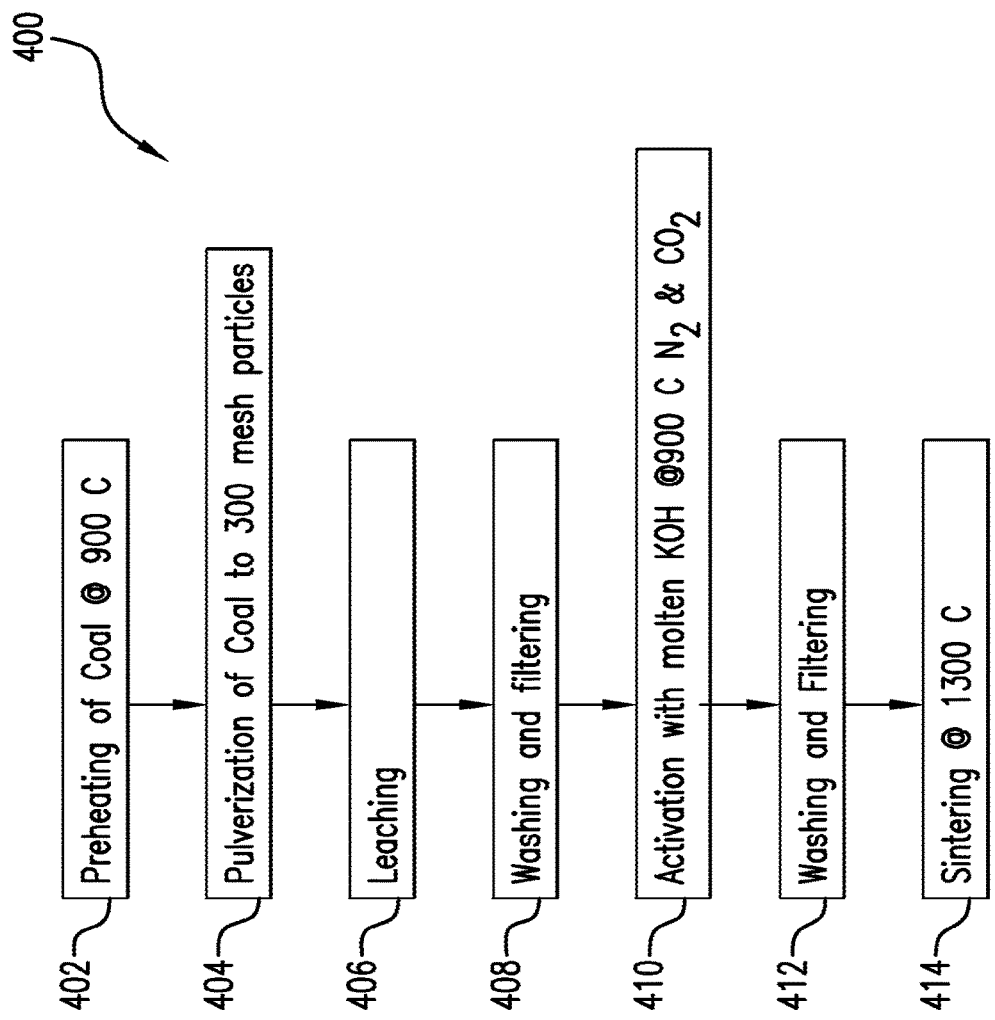
FIG. 4 is a schematic of an exemplary set of steps involved in synthesizing activated carbon from anthracite coal (i.e. activated coal) according to one or more embodiments.

FIG. 4 describes a process 400 according to one or more embodiments for obtaining a high surface, high graphitic content carbon from coal. The process includes preheating of coal 402, pulverization of preheated coal 404, leaching 406, washing and filtration 408, activation 410, washing and filtration 412, and sintering 414.

The coal is preheated prior to pulverization to reduce the particle size. In certain embodiments the coal is preheated to a temperature sufficient to reduce the mechanical strength of the coal, which will in turn help to pulverize coal into desired mesh size.

For example, the coal is heated to a temperature in the range of 500 to 1500° C.; and in one particular embodiment can be heated to around 900° C. The coal is typically heated in an inert atmosphere for a time period in the range of 4 to 24 hrs. In certain embodiments, preheating is performed in a furnace capable of maintaining inert atmosphere.

The pulverization step is accomplished using conventional methods, such as ball milling. Grinding the coal serves to reduce particle size and to expose and internal closed porosity generated during the coal formation process.

In certain embodiments, the coal is typically reduced in size to 300 mesh.

Once the coal has been pulverized, the coal powder is treated to remove impurities that could interfere with battery performance. In certain embodiments, the step of leaching 106 involves using strong acids such as HCl, $H_2SO_4$, and $HNO_3$ for purifying coal. Suitable leaching agents include those capable of dissolving heavy metal ions, such as lead, arsenic, selenium, cadmium, chromium, nickel and manganese that are commonly found as impurities.

In other embodiments, the coal powder is treated with oxidizing agents such as hydrogen peroxide. Not being bound by theory, the purpose of oxidizing agent is to remove heavy metals ions by forming water-soluble complexes.

Exemplary leaching conditions include dispersing pulverized coal into water and mixing with leaching solution at room temperature. The contents are typically stirred for 24 to 48 hrs.

After leaching to remove impurities, the coal is washed with water to remove leaching agents and residual impurities. The coal can be washed several times until no further impurities are identified in the wash water.

The next step activates the coal and increases surface area. In certain embodiments, the step of activation involves the use of strong bases such as KOH, NaOH, and LiOH. Leached and dried coal is mixed with a strong base and the heated at low temperatures in the range of 450-900° C. Typically the ratio of coal to base is 1:4 wt %. It is believed that the surface activation step proceeds simultaneously with the chemical activation.

Once activated, the activated coal powders are sintered to introduce a controlled graphitic content. In certain embodiments, the sintering step (for carbonizing coal) is performed between 900° C. and 2000° C. Typical heating times varies from 6 to 24 hrs. The use of this temperature range in the sintering step allows for an increase of conductivity but does not significantly reduce the material's surface area. In certain embodiments, the sintering step is performed using two different gas environments. In certain embodiments, the gas environment can be a combination of any of $N_2$, CO2, Ar, He, $H_2$, CO, or NOx. In some embodiments, inert environment is required to avoid burning of coal at high sintering temperatures. A combination of gases can also be used.

In other embodiments, carbonaceous materials other than coal may also be subjected to similar purifying process, activation process, and/or sintering process described above for coal.

Once the high surface area activated coal (or other carbonaceous materials) has been obtained, it is infused with sulfur in a process that provides at least 60 wt % sulfur loading in a single step. In certain embodiments, gaseous sulfur is infused into the activated coal material after activation. In certain embodiments, elemental sulfur and activated coal are pre-mixed prior to the infusion. In this case, pre-mixing is commonly performed in a ball mill (typically for 30 min). While not being bound by theory, it is believed that pre-mixing helps to form a uniform sulfur carbon composite. In certain embodiments, this infusion is performed under temperatures between 450 and 1000° C. for 1 to 10 hrs, 1 to 4 hrs, or 1 to 2 hrs. In certain embodiments, this infusion is performed under temperatures between 450 and 1000° C. for 1, 2, 10, 30, or 60 minutes.

In some embodiments, the sulfur infused activated coal material (or other carbonaceous materials) has high surface area, high conductivity (i.e., high graphitic content), and high sulfur loading for improved lithium ion cathode performance. In some embodiments, the surface area ranges from 100 to 2000 $m^2/g$, or preferably between 900 and 1200 $m^2/g$. In some embodiments, the graphitic content ranges between 1 and 20 mass %, or preferably between 5 and 10 mass %. In some embodiments, the sulfur loading ranges between 5 and 95% (of total weight), or preferably between 50 and 70% (of total weight). High surface area is important for lithium ion diffusion, high conductivity is important for good charge/discharge characteristics, and high sulfur loading is important for charge capacity. In some embodiments, the capacity of the cell ranges between 400 and 1200 mAh/g, or preferably between 700 and 1000 mAh/g.

Materials and Batteries

The sulfur-infused carbonaceous materials as disclosed herein have high capacity and excellent cycle properties. As described above, polysulfide shuttling and low electrical conductivity of sulfur remain two main obstacles for the broad application of Li—S batteries. Applicants have surprisingly found that the sulfur-infused carbonaceous materials prepared accordingly to methods disclosed herein possess high capacities and cyclability when used in a Li—S battery. Without wishing to be bound by any particular theory, it is believed that when sulfur is infused into highly porous carbonaceous material, the porous carbon plays the dual role of enhancing the overall conductivity of the composite cathode as well as limiting polysulfide dissolution in the electrolyte by trapping the lithium polysulfide from the electrolyte. The methods of sulfur-vapor-infusion into carbon as described herein enables significant sulfur incorporation into carbon, e.g., more than 50 wt %, 60 wt %, 65 wt %, 70 wt %, 75 wt %, 80 wt %, 85 wt %, 90 wt %, 95 wt %, or 97 wt % of sulfur, after a single heating operation. The methods described herein maximizes the amount of sulfur sequestered by the carbon pores and there by minimizes lithium polysulfide dissolution/shuttling in the electrolyte and finally facilitate good transport of electrons from the poorly conducting sulfur.

The methods as described herein enable sequestering vapor-infused sulfur into the carbonaceous materials' nano pores. The nano pores have sizes less than 100 nm, 10 nm, 1 nm, 100 pm, or 10 pm. These pores simultaneously prevent dissolution and shuttling of so-called long-chain lithium polysulfides, generated at the cathode during charging, and facilitate transport of electrons into and out of the cathode to improve conductivity. The former feature makes it possible to retain high charge storage capacity over many charge-discharge cycles, and the latter enhances charge/discharge stability of the cell at much higher charge rates than previously possible with a secondary Li—S battery. The nano pores sequester and amorphize the sulfur, and act as mini reactors that constrain reaction of lithium ions in solution and sulfur in the pores. The resultant lithium sulfides (both soluble and insoluble polysulfides) are also constrained by the pores, which, prevents their loss to the electrolyte enhancing the reversibility of the sulfur/sulfide reaction.

Accordingly, in some embodiments, sulfur-infused carbonaceous materials produced using methods described herein have an initial battery capacity between about 400 and about 1200 mAh/g, when used in a Li—S battery. In some embodiments, the initial battery capacity is between about 700 and about 1000 mAh/g, or 800 and about 900 mAh/g. In other embodiments, the initial battery capacity is about 700, about 800, about 900, about 1000, about 1100, or about 1200 mAh/g.

In some embodiments, the sulfur-infused activated coal material or other carbonaceous materials can be incorporated into the cathode of a lithium secondary cell to produce a high energy density, low-cost rechargeable battery with low-fade charge-discharge characteristics. In some embodiments, the battery consists of an anode, a cathode, and a separator disposed in between. The cell geometry may be coin cell, prismatic, or cylindrical cell. In some embodiments, lithium metal is used as the anode.

In some embodiments, a hybrid electrolyte consisting of thermally stable ionic liquid, lithium salt, a polymer and aprotic solvents is used in the secondary cell. The ionic liquid may contain an organic cation and inorganic/organic anion, with the organic cation selected from a family of N-alkyl-N-alkyl-pyrrolidinium, N-alkyl-N-alkyl-pyridinium, N-alkyl-N-alkyl-imidazolium, N-alkyl-N-alkyl-phosphonium, N-alkyl-N-alkyl-sulfonium, N-alkyl-N-alkyl-ammonium, and N-alkyl-N-alkyl-piperdinium, and the anion selected from group of tetrafluoroborate, hexafluorophosphate, bis(trifluoromethylsulfonyl)imide, bis(pentafluoroethylsulfonyl)imide, and trifluoroacetate. The polymer in the electrolyte may include poly(ethylene glycol) derivatives, with varying molecular weights ranging from 150 to 10000000 g/mol. The aprotic solvent may be selected from the group consisting of carbonates, ethers, acetamides, acetontrile, symmetric sulfones, 1,3-dioxolanes, dimethoxyethanes, glymes, siloxanes and their blends. The lithium salt may be $LiBF_4$, $LiNO3$, $LiPF6$, $LiAsF6$, Lithium bis(trifluoromethylsulfonyl)imide (LiTFSI), Lithium bis(pentafluoroethylsulfonyl)imide, and Lithium trifluoroacetate.

Reactors

In another aspect, a reactor for producing a sulfur-infused carbonaceous material as a cathode material for use in a Li—S battery is described. The reactor includes a pressure-resistant reactor body configured to withstand a pressure up to about 150 atm; and an inner sulfur-resistant layer at the inner surface of the reactor body, where the inner layer is inert to sulfur vapor at the reaction temperature. In certain embodiments, the reaction temperature is from about 450° C. to about 1000° C.

In some embodiments, the reactor as disclosed herein is described with references to FIGS. 5 and 6. FIG. 5 illustrates an exemplary of a reactor disclosed herein. The reactor has a tube-shaped reactor body 502 and metal flange 510 that is mated with a cover plate 508 which seals the reactor during reaction. The reactor also has one or more metal pins 504 to secure the flange 510 to the cover plate 508. The reactor may optionally contain outlet 506 which may be used to insert a temperature or pressure sensor to monitor the progress of the reaction.

FIG. 6A is a schematic drawing of an exemplary reactor 612 according to one or more embodiments for producing sulfur-vapor-infused carbonaceous material. The reactor has a reactor body 602 and an inner layer 604 at the inner surface of the reactor. Because the sulfur-vapor-infusion occurs at high temperature and under a pressure more than 1 atm within the reactor chamber 610, the inner layer 604 needs to be made of a material which is resistant to sulfur vapor under such conditions.

As described above, in certain embodiments, the temperature for the sulfur-vapor-infusion is from about 450° C. to about 900° C., from about 500° C. to about 800° C., from about 500° C. to about 700° C., or from about 500° C. to about 600° C. Thus, in certain embodiments, the inner layer 604 is made of a material selected from the group consisting of titanium, molybdenum, Tungsten, quartz, alumina, silicon carbide, Nucerite 7040 (Pfaudler), Nitraglass 6510 (Pfaudler), SiO2, and a combination thereof. Applicants have found that these materials are resistant to the highly corrosive sulfur vapor at high temperature as described above.

As described above, in certain specific embodiments, the pressure under which the sulfur-vapor-infusion is carried out is about 2 atm, about 3 atm, about 5 atm; about 10 atm, about 20 atm, about 25 atm, about 50 atm, about 100 atm, or about 150 atm. Thus, in certain embodiments, the reactor body 602 is made of a material capable of withstanding such high pressure and is selected from the group consisting of titanium, molybdenum, Tungsten, stainless steel, and a combination thereof.

In certain embodiments, the reactor body 602 and the inner layer 604 are made of the same material, which is both sulfur-resistant under the reaction temperature and pressure-resistant under the reaction pressure. Such material may be selected from the group consisting of titanium, molybdenum, Tungsten and a combination thereof. In these embodiments, the reactor body 602 and the inner layer 604 together form a unitary body of the reactor (FIG. 6A) and there is no space between the reactor body 602 and the inner layer 604.

In certain other embodiments, the reactor body 602 and the inner layer 604 are made from different materials. In these embodiments, the reactor body 602 may be made of a pressure-resistant low-cost material such as stainless steel. Such pressure-resistant low-cost material, e.g., stainless steel, however, may be highly susceptible to sulfur-corrosion under elevated temperatures such as those used in the methods described herein. Applicants have found that a variety of stainless steel alloys that were recommended by equipment manufacturers for use in pressure vessels in sulfur containing environments are subjected to significant sulfur corrosion under the sulfur-infusion conditions described herein. These materials include: Haynes HR 160, Haynes HR 120, Haynes 25, Haynes 556, Haynes 282, Rolled Alloys 309H SS, Rolled Alloys 310H SS, Rolled Alloys 253 MA, and Rolled Alloys 330 SS. However, these stainless steel materials may be used to manufacture the reactor body of the reactor because its ability to withstand high pressure, if a sulfur-resistant material as the inner layer is used.

In certain such embodiments, the inner, sulfur-resistant layer 604 may be a coating coated on the inner surface of the reactor body 602. The coating may have a thickness of about 1 microns, 10 micros, 20 microns, 30 microns, 50 micros, or 100 microns. Such coating may be made of a sulfur-resistant material selected from the group consisting of titanium, molybdenum, Tungsten, quartz, alumina, silicon carbide, Nucerite 7040 (Pfaudler), Nitraglass 6510 (Pfaudler), SiO2, and a combination thereof. The presence of such protective layer 604 prevents the pressure-resistant but sulfur-corrodible reactor body 602 made form materials such as stainless steel from reacting with the sulfur vapor under the sulfur-infusion conditions. In these embodiments, the inner layer 604 is coated on the inner surface 616 of the reactor body 602 as shown in FIG. 6A).

Figure 6B:
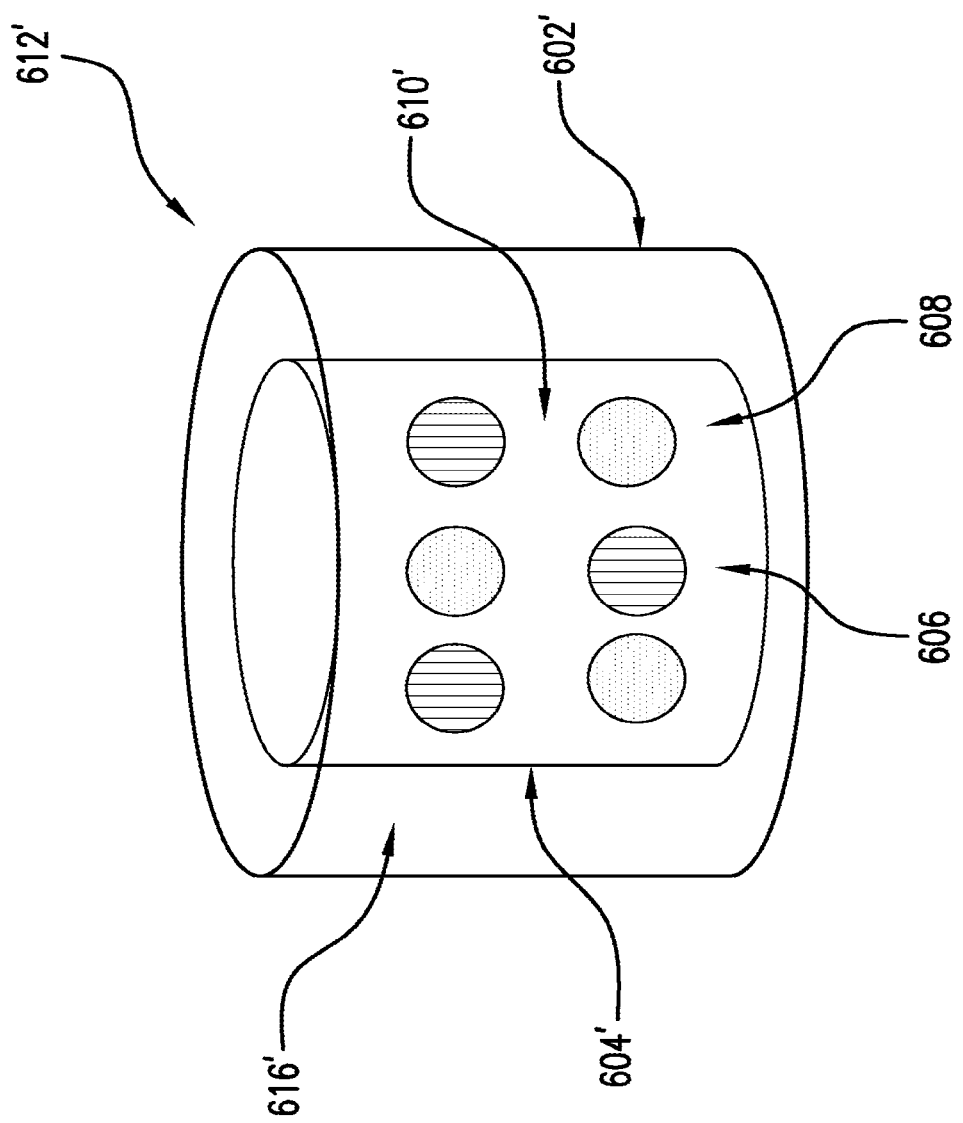

In certain other such embodiments, as shown in FIG. 6B), the inner, sulfur-resistant layer 604' is a sheath or a liner which can slide in and out of the reactor body 602'. In these embodiments, the sheath or liner may be in any form factor as long as it prevents sulfur vapor from leaking into the space 616' between the reactor body 602' and the inner, sulfur-resistant layer 604'. In some embodiments, the leaking is prevented by creating a pressure tight seal so that the sulfur vapor cannot leak into the space 616'. In some specific embodiments, a gasket is used to seal the top and bottom faces of the reactor 612' (not shown). In some specific embodiments, the inner sheath or liner 604' may not be pressure resistant and is subject to cracking under the high pressure conditions described herein. In these embodiments, counter-pressure with a gas may be applied in the space 616' between the reactor body 602' and the sheath or liner 604', equalizing pressure on both sides of the sheath or liner 604' wall during operation.

The methods as described herein may be carried out in the reactor 612 or 612'. As shown in FIG. 6A or 6B, element sulfur 606 and carbonaceous material powders are premixed in reaction chamber 610 or 610' and then the reactor can be subjected to heating under the conditions as described above to infuse sulfur into the carbonaceous material. After heating for the selected time period described above at the temperature describe above, the reactor is cooled to room temperature to produce the sulfur-infused carbonaceous material.

The non-limiting embodiments are described in greater detail in the following examples.

EXAMPLES

Characterization Techniques:

Surface analysis and phase purity measurements were carried out on the carbon and S @ C using Transmission electron microscopy (TEM, Tecnai, T12, 120 kV) and powder X-ray diffraction (Scintage X-ray diffractometer with Cu Ka radiation). Percentage of sulfur present in the S @ C composite was calculated using Thermogravimetric Analysis (under Ar, Thermo Scientific TA Instrument (Nicolet iS10) operated at a heating rate of 20° C./min). Coin cells for electrochemical analysis were assembled using the procedure mention under Section 2.2. Cyclic Voltammetry and electrochemical charge discharge analysis were carried out using Solartron's Cell Test model potentiostat (potential window 1.7-2.8 V at a scan rate of 0.2 mV/s) and MTI cycle life tester (under the potential window 1.7-2.8V).

Example 1. Porous Carbon Synthesis/Activation and Sulfur Infusion Procedure

Processes to use high surface area carbon from various sources as the host for sulfur in Li—S @ C batteries have been developed. Specifically, Applicants have developed a high temperature chemical as well as a physical methodology to activate carbon, e.g., low cost carbon. Activation of the carbonaceous material was carried out using KOH and high temperature. In a process described herein, carbon was dispersed in tetrahydrofuran (THF) then mixed with KOH and dried at medium temp for a few hours. The dried carbon KOH mixture was heated at increasing temps in N2 and then in a CO2 atmosphere. After the activation process, the carbon KOH mixture was washed completely and heated again to >1000° C. to increase the graphitic content (improve conductivity) in the carbon. These developments have resulted in successful synthesis of high surface area, conductive carbon nanostructures. Using this activated carbon, significant sulfur infusion, e.g., more than 70 wt % sulfur has been achieved.

Example 2

Coal was heated at 900° C. for 8 to 10 hrs under N2 atmosphere. This heat treatment helped to efficiently pulverize coal in the next step. Preheated coal was pulverized using a ball mall to 300 mesh size particles. The pulverized coal particles were treated with leaching solution containing acids such as, HNO3, HCl, etc, oxidizing agents such as $H_2O_2$ and water. This step was very critical in removing the impurities such as heavy metal ions from the coal.

After leaching, coal was washed several times with water and filtered. This step ensured that the unreacted leaching agents are removed from the coal particles. This step was followed by activation. Leached and dried coal was mixed with KOH at 1:4 weight ratio and heated at 200° C. for 2 hours. Then coal/KOH mixture was heated at 500° C. for 2 hr and 900° C. for 10 hr in N2 and for 2 hr in $CO_2$ atmosphere. This activation step increased the surface area and pore volume of the coal particles.

After activation, coal was again washed several times with water and filtered. This step ensured that the unreacted KOH was removed from the coal particles. During the subsequent sintering step, washed coal was heated at 1300° C. under N2 atmosphere. This step increased the graphitic content and also removed any remaining KOH.

The surface area of the resulting activated coal was 1450 $m^2/g$ and average pore size was 4 nm. Surface are and pore size were determined using BET methods.

Example 3

Figure 8:
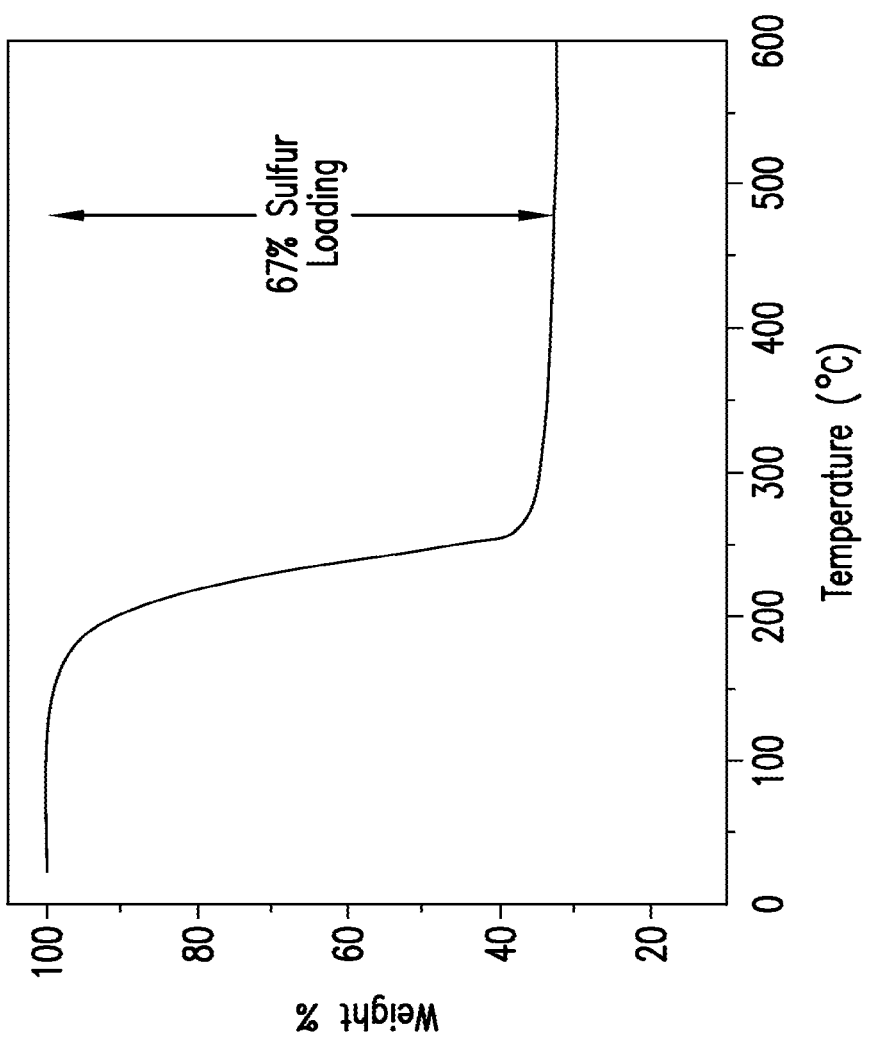
FIG. 8 is a thermo gravimetric analysis plot showing sulfur loading in the activated carbon derived from coal according to one or more embodiments.

Activated coal was produced as detailed in Example 2. Elemental sulfur was infused into the activated coal in the vapor form using the vacuum-sealed reactor shown in FIG. 7. 300 mg of activated coal and 700 mg of elemental sulfur were mixed and transferred into the glass reactor. The completely sealed reactor was heated at 550-600° C. for 4 to 6 hr. This method of sulfur infusion facilitated fast, efficient, and controlled infusion of elemental sulfur into the host activated coal. Thermo Gravimetric Analysis (TGA) plot shown in FIG. 8 shows that about 67% of the mass of the sulfur infused activated coal (S @ C) composite was comprised of sulfur.

Example 4

The material of Example 3 was incorporated into the cathode of a lithium ion secondary cell. A S @ C cathode slurry was prepared, by mixing 85% of the S @ C composite and 7.5% of polyvinylidene fluoride (PVDF) binder and 7.5% conducting activated coal (Super P) in N-methyl pyrrolidine (NMP) solvent. Positive electrodes were produced by coating this slurry on aluminum foil and drying at 90° C. for 12 h. The resulting slurry-coated aluminum foil was roll-pressed and the electrode was reduced to the required dimensions with a punching machine. The electrode thickness of the entire prepared electrodes was 80 p.m after 85% reduction of the original thickness through the roll press.

Preliminary Li—S battery tests were conducted on 2032 coin-type cells, which were fabricated in an argon-filled glove box using lithium metal anode and a microporous polyethylene separator. The separator was interposed between the anode and cathode. The electrolyte solution containing 0.5M lithium triflate and 0.1M lithium nitrate in 5:3:2 volume ratio of tetraethylene glycol dimethylether, 1,3-dioxolane and dimethoxyethane was used.

Figure 9:
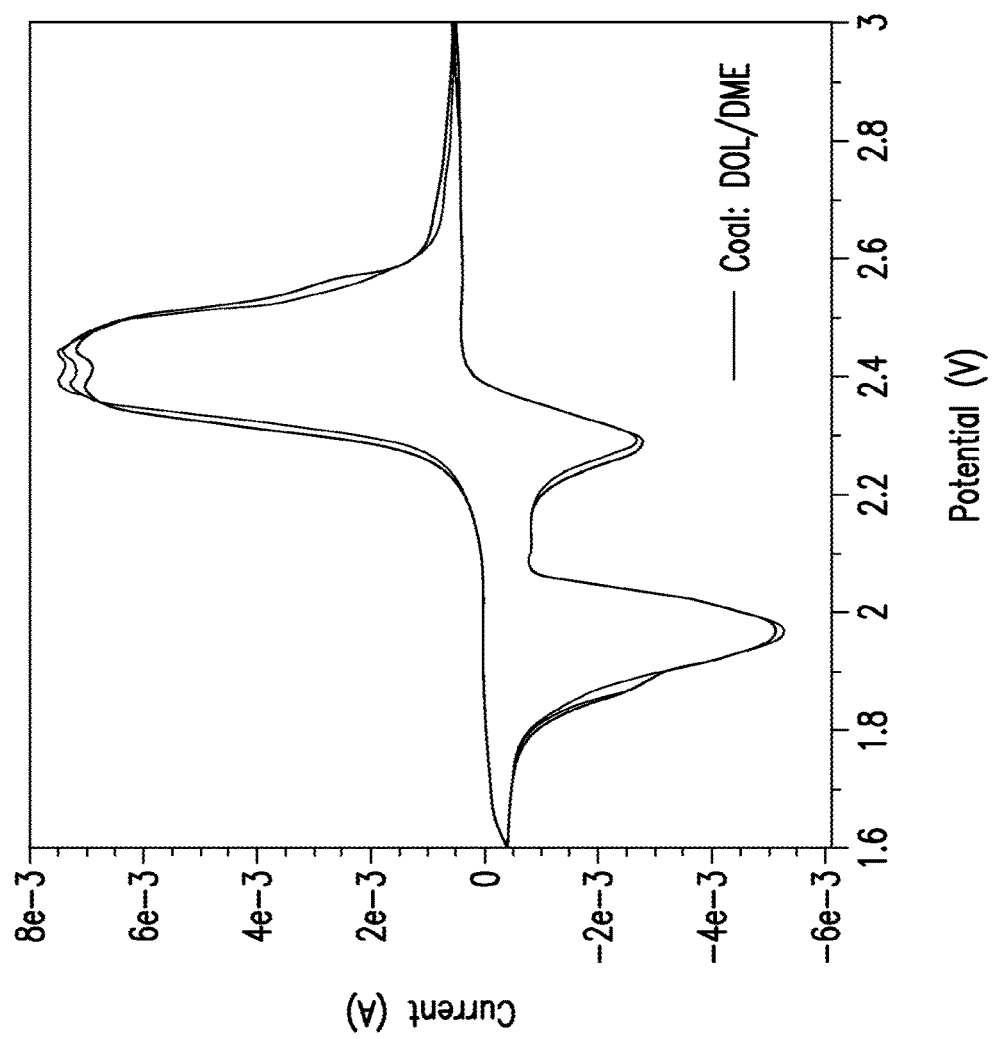
FIG. 9 is a plot of the cyclic voltammogram (CV) of sulfur-infused activated carbon derived from coal according to one or more embodiments.

To characterize the oxidation/reduction behavior of sulfur and polysulfides, slow scan cyclic voltammetry (CV) was carried out using a Princeton Applied Research potentiostat. The CV sweeps were performed on the S @ C composite cathodes between 3 to 1.6 V using 0.2 mV/s scan rate. During the Li—S redox reaction, electrochemical reduction of elemental sulfur occurs in two different stages. In the first stage, sulfur reduces to higher order polysulfides ($Li_2S$., 4<n<8) and further reduction results in $Li_2S$. Typically, the two distinct reduction processes happen at −2.3V (vs Li/Li+) and at −2.0 V (vs Li/Li+). Similarly, during the oxidation process conversion of $Li_2S$ to elemental sulfur occurs at −2.45 V. As shown in FIG. 9, the CV scans were repeated for 10 cycles and no significant changes were observed in the CV peak positions or peak currents. These results suggest that the combination of sulfur infused activated carbon derived from coal and the electrolyte were effective in reducing polysulfide dissolution (i.e., the dissolution of sulfur into the electrolyte). While not being bound by theory, it is believed that the combination of sequestered sulfur and electrolyte effectively reduces the dissolution.

Figure 10:
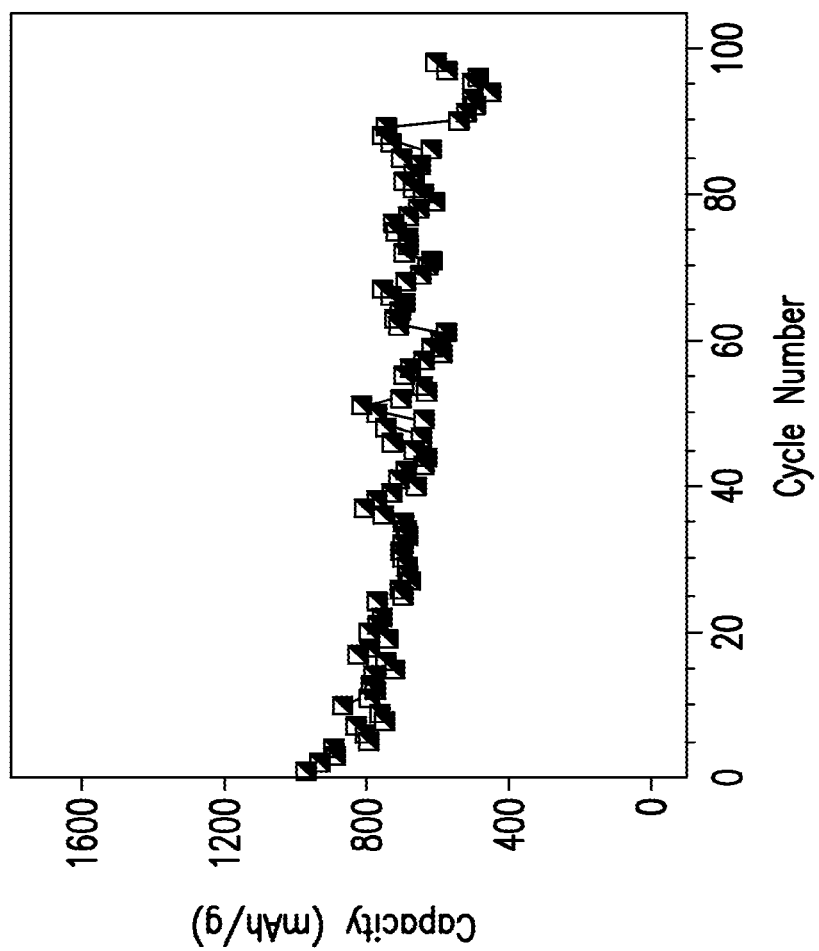
FIG. 10 is a plot of the variation of discharge capacity as a function of number of charge/discharge cycles according to one or more embodiments.

A galvanostatic charge and discharge test was performed to investigate the changes of the electrochemical properties of the Li—S battery with the synthesized S @ C composite cathode under the cell voltage of 3.0-1.7 V at a current rate of 0.2 C-rate. FIG. 10 depicts the capacity vs. cycle plots of the Li—S @ C batteries at room temperature. A very high initial capacity was observed and gradually, the capacity decreased and remained constant for 100 cycles. At the end of 100 cycles, activated carbon derived from coal showed specific capacity of 550 mAh/g. The capacity was reported here in terms of the percentage (67%) of the sulfur active mass. Even at a lower than initial capacity, the energy density of the Li—S cell based on the activated carbon derived from coal was >1000 Wh/kg, which is significantly higher than the energy density of the state of the art Li-ion batteries.

Example 5 Characterization of the Produced Sulfur-Infused Carbonaceous Material (S @ C)

The following physical and electrochemical properties are obtained for both Li—S cells made of sulfur infused carbon composite (lab-scale) and S @ C made in the large scale reactors. The large scale reactor in this example was made from quartz and placed within a furnace to heat the reactor. Quartz was found to be resistant to sulfur corrosion. In a separate embodiment, the quartz material was used to make a sheath or liner to be included in a reactor body made from pressure-resistant stainless steel. The sulfur-infusion occurred within the quartz sheath. The pressure-resistant reactor body was physically separated from the sulfur-containing quartz chamber, allowing stainless steel alloy to be used. Counter-pressure with a gas is applied between the quartz tube and the steel reactor body, equalizing pressure on both sides of the quartz tube's wall during operation.

Figure 11:
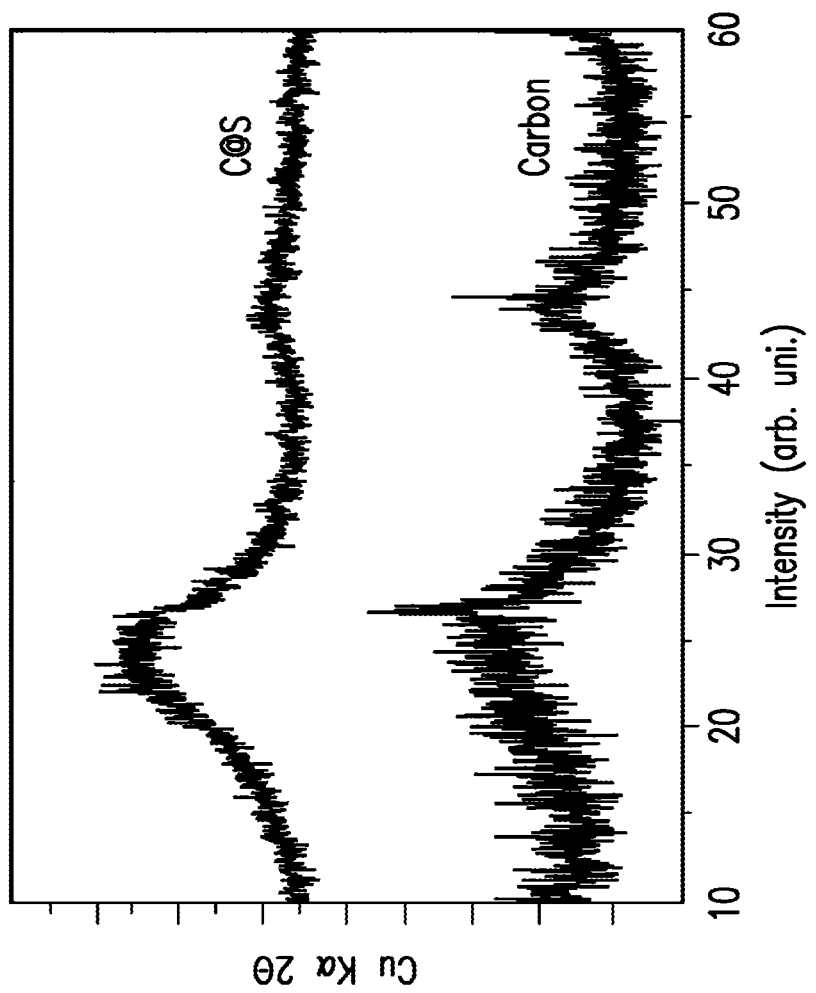
FIG. 11 illustrates the XRD patterns of the activated carbon (bottom) and sulfur infused activated carbon (top).

Sulfur Infused into Lab Scale Carbon Composite:

To check the microstructure and the graphitic character of the activated carbon before and after sulfur infusion, the materials were characterized by powder XRD (X-ray diffraction). FIG. 10 shows a typical powder XRD patterns of the carbon before and after sulfur infusion, which exhibits peaks at 20-28 and 45° that can respectively, be ascribed to (002) and (101) planes associated with the graphitic pore walls. No apparent peak due to sulfur was noticed in the powder XRD pattern of the S @ C composite. This indicates that the infused sulfur exists in fine particles and in a highly dispersed state, with the crystalline elemental sulfur most likely converted to amorphous phase after heat treatment. FIG. 11 illustrated the XRD patterns of the activated carbon (bottom) and sulfur infused activated carbon (top). The XRD clearly show that the activated carbon possesses partially graphitic (crystalline) behavior.

Figures 13A, 13B:
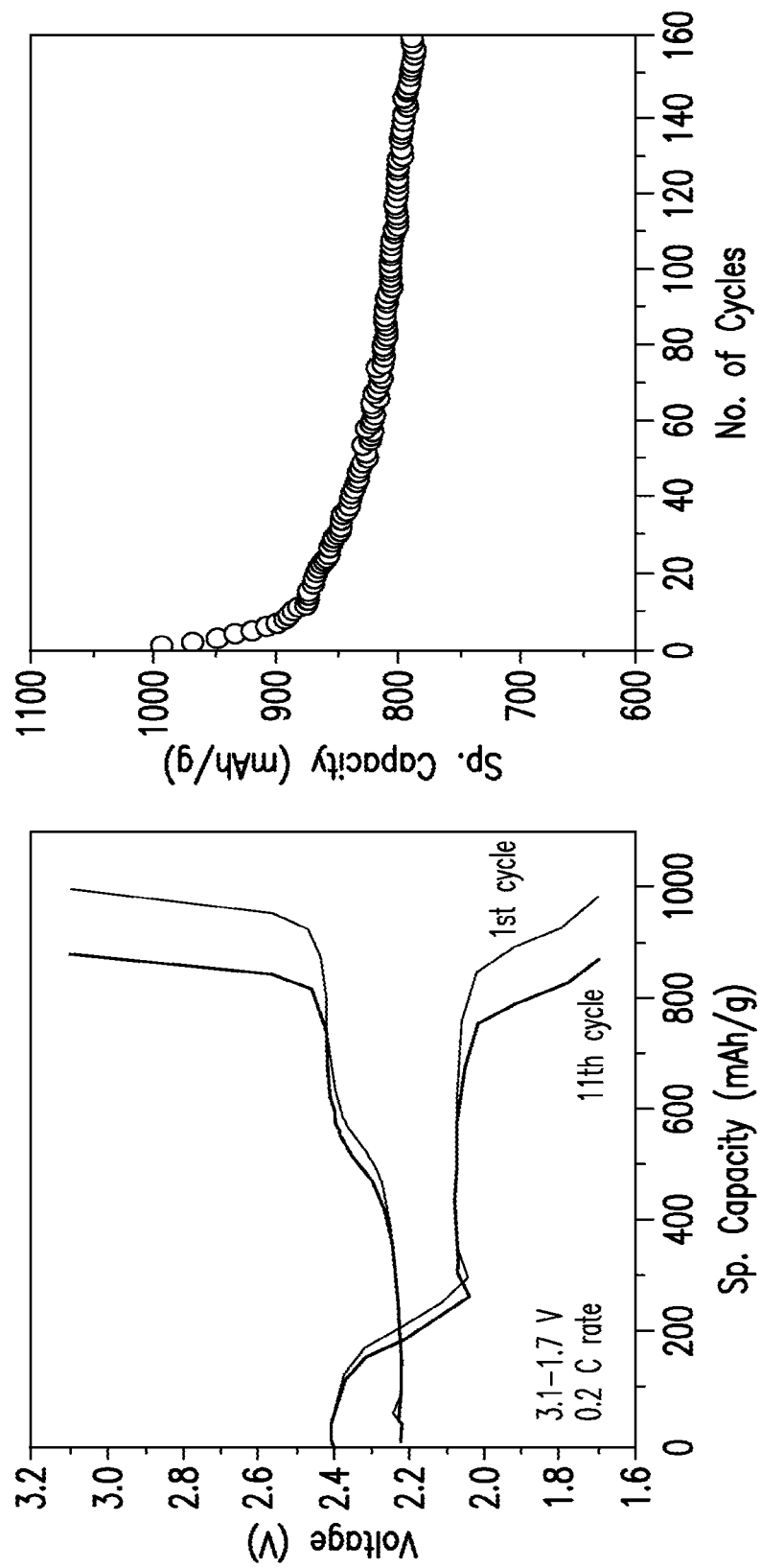
FIGS. 13A and 13B shows a galvanostatic discharge coin cell test of the lab scale material at 0.2 C for-150 cycles.

Elemental composition of a representative lab scale S @ C composites analyzed by energy-dispersive X-ray (EDX) microanalysis is shown in FIG. 12A. An EDX spectrum collected from different locations within the S @ C material confirms the presence of sulfur throughout the composite. Thermo Gravimetric Analysis plot for this S @ C sample shown in FIG. 12B illuminates nearly 61% of the mass of the S @ C composite is comprised of sulfur. FIG. 13 shows a galvanostatic discharge coin cell test of the lab scale material at 0.2 C for 150 cycles. FIG. 13A shows a Voltage vs. capacity property of the material and FIG. 13B shows a galvanostatic profile of Li—S @ C battery under the potential window 3.1-1.7 V and at 0.2 C rate (lab-scale material).

Figure 14B:
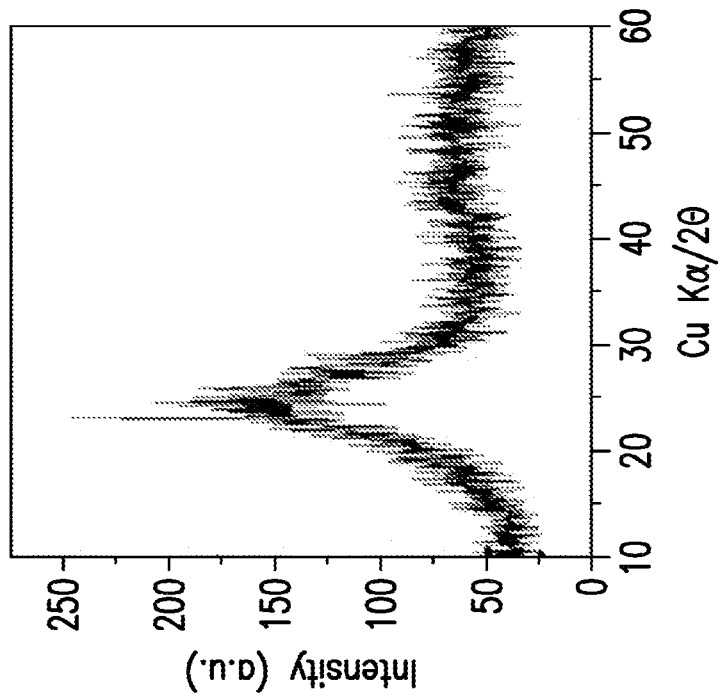
FIGS. 14A and 14B shows the powder XRD patterns of FIG. 14A activated coconut carbon and FIG. 14B sulfur infused activated coconut carbon using a large-scale reactor.
Figure 14A:
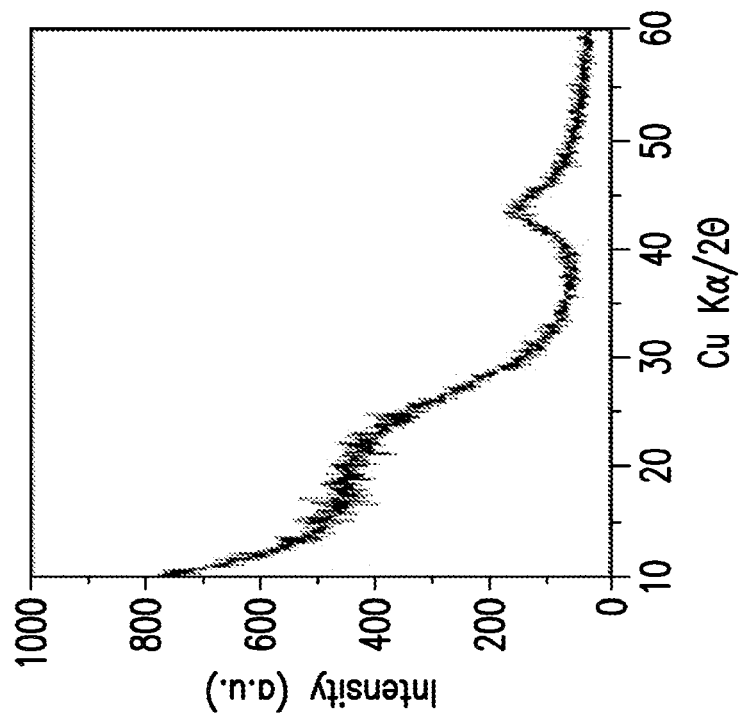

Physical and Electrochemical Properties of S @ C Composite Produced Using a Reactor:

The physical and electrochemical data reported for the Li—S batteries assembled using the S @ C cathode produced by the large-scale reactor from commercially available activated coconut carbon. FIGS. 14A and 14B shows the powder XRD patterns of the large-scale carbon before and after sulfur infusion using large scale reactor, which exhibits peaks at 20 28 and 45° that can respectively, be ascribed to (002) and (101) planes associated with the graphitic pore walls. No apparent peak due to sulfur was noticed in the powder XRD pattern of the S @ C composite. This indicates that the infused sulfur exists in fine particles and in a highly dispersed state, with the crystalline elemental sulfur most likely converted to amorphous phase after heat treatment. Specifically, FIGS. 14A and 14B illustrates the XRD patterns of FIG. 14A activated coconut carbon and FIG. 14B sulfur infused activated coconut carbon using a large-scale reactor.

Figure 15B:
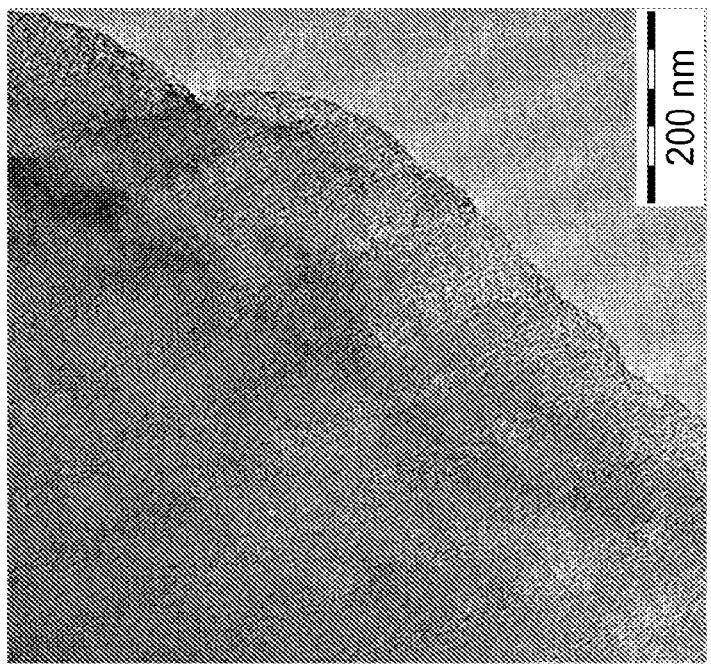
FIGS. 15A and 15B shows the TEM images of the FIG. 15A activated commercial coconut carbon and FIG. 15B after sulfur infusion.
Figure 15A:
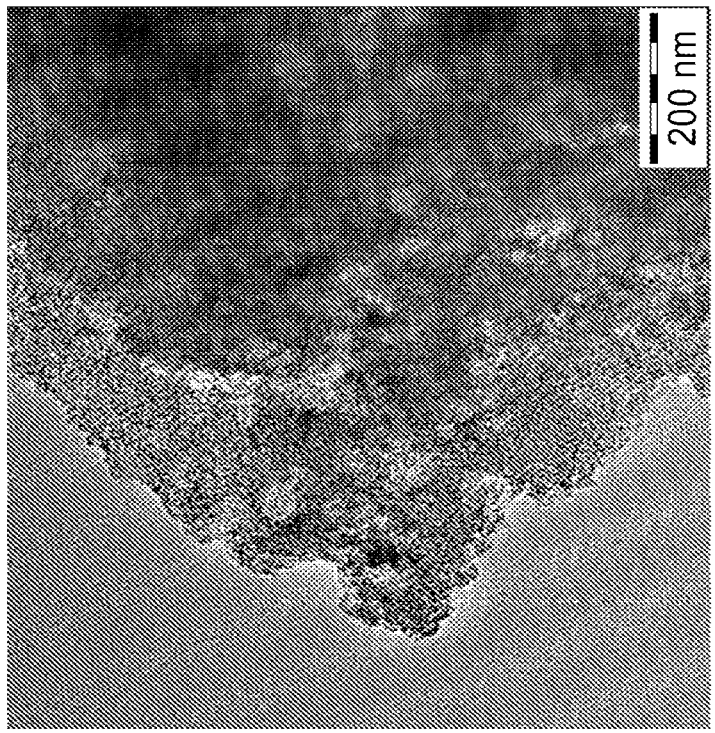

FIGS. 15A and 15B shows Transmission Electron Microscopy of the coconut carbon before and after sulfur infusion. There is not much difference in the TEM pattern of activated coconut carbon. However, the highly porous nature of the activated coconut carbon is clearly visible from the TEM images obtained.

Figure 16B:
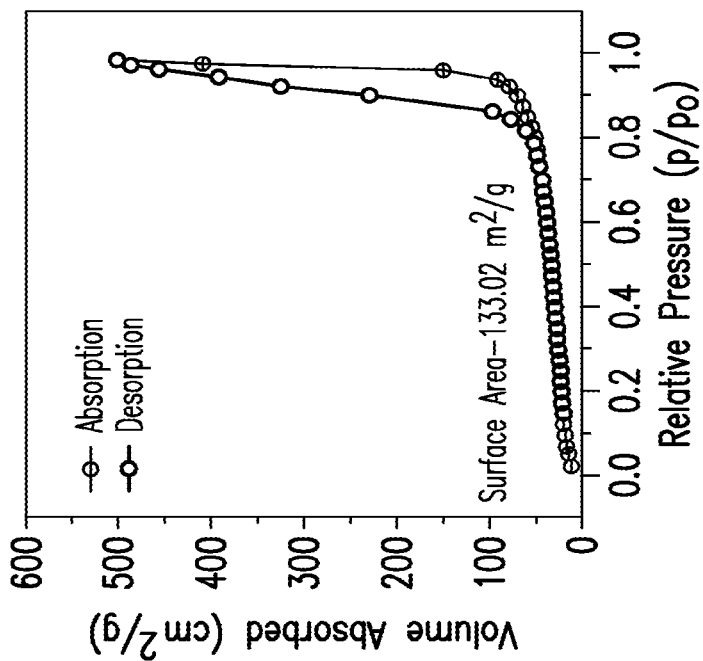
FIGS. 16A and 16B shows the nitrogen sorption isotherm of the activated coconut carbon FIG. 16A before sulfur infusion and FIG. 16B after sulfur infusion.
Figure 16A:
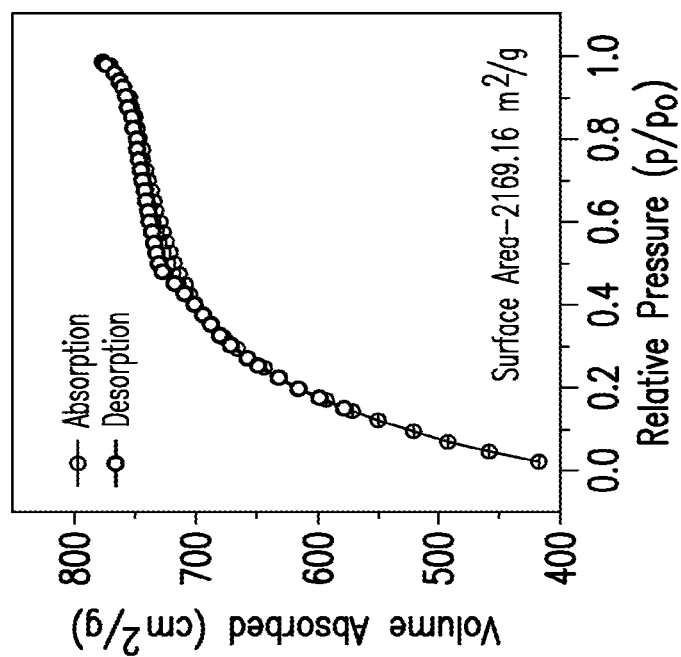

FIGS. 16A and 16B represents the BET surface area analysis of the activated coconut carbon before and after sulfur infusion. As expected, the surface area of the coconut carbon was reduced after sulfur infusion, which, can be corroborated to the infusion of sulfur in the minute pores of carbon matrix. That is, the surface area of the activated carbon was found to be 2169 $m^2/g$ with 4 nm pore size and a pore volume of 1.4 $cm^3/g$. Upon sulfur infusion the surface area of the activated carbon was found to be 133 $m^2/g$ with a pore size of 4 nm in diameter and a pore volume of 0.2 $cm^3/g$. It is also interesting to note that the nature of the BET isotherm changed upon infusing sulfur into activated coconut carbon. This may be attributed to the change in the physical and chemical nature of the coconut carbon upon sulfur infusion. Thermo Gravimetric Analysis plot shown in FIG. 17 illuminates nearly 67% of the mass of the S @ C composite is comprised of sulfur.

Figure 18:
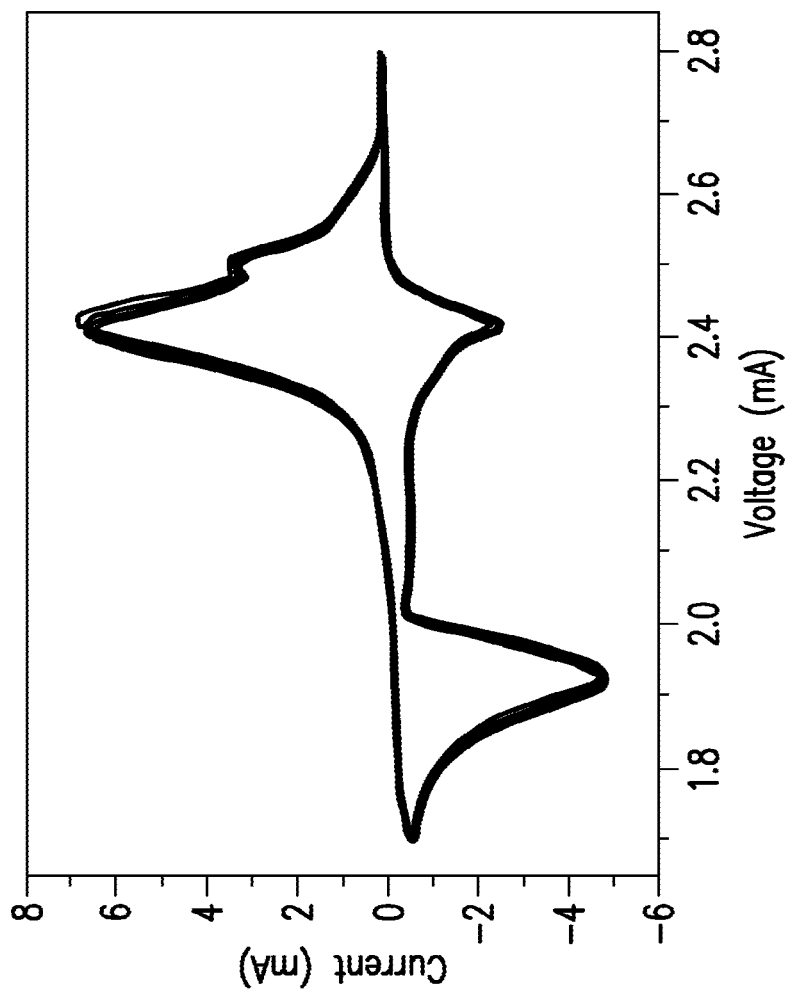
FIG. 18 shows a typical cyclic voltammogram of S @ C composite according to one or more embodiments at a sweep rate 0.2 mV/s under the potential window 1.7-2.8 V.

FIG. 18 shows the cyclic voltammogram (CV) of the S @ C composite studied in the potential range of 1.7-2.8 V vs. Li/Li+ at a scan rate of 0.2 mV/s. The voltammogram obtained was similar to that of the pattern reported for Li—S batteries with aerogel carbon based sulfur composite (lab-scale). The CV pattern of the synthesized S @ C composite exhibited a pair of cathodic peaks at −2.4 and −1.9 V and a corresponding pair of anodic peaks at −2.35 and 2.45 V. The first peak at 2.4 V involves the reduction of elemental sulfur to lithium polysulfide ($Li_2S_n$, 4<n<8). The second peak at 1.9 V involves the reduction of sulfur in lithium polysulfide to $Li_2S_2$ and eventually to $Li_2S$. The anodic process also occurs in two stages. The anodic peak at 2.35 V is associated with the formation of Li$_2$S. (n>2). This process continues until lithium polysulfide is completely consumed and elemental sulfur produced at 2.45 V.

FIG. 18 shows: (a) Voltage vs. capacity profile and (b) Cycle life behavior of Li—S battery assembled with the S @ C composite in Example 5 at 0.5 C current rate under the potential window 1.7-2.8V. The capacity is reported here in terms of the percentage (67%) of the sulfur active mass.

The galvanostatic charge and discharge test is performed in order to investigate the changes of the electrochemical properties of the Li—S battery with the synthesized S @ C composite cathode under the cell voltage of 1.7-2.8 V at 0.5 C current rate. FIG. 19A displays the voltage vs. capacity plots of the Li—S battery at room temperature. An initial discharge capacity of 820 mAh/g was observed with the discharge/charge plateaus reflecting the reversible formation of various products starting from the elemental sulfur to Li$_2$S. The cycle life plot of the Li—S battery for 300 cycles containing is shown in FIG. 19B. Excellent cycling stability in addition to enhanced columbic efficiency is observed from first to 300$^{th}$ cycle. Herein, the current rate is based on the theoretical capacity of sulfur and the capacity is reported in terms of the percentage of the sulfur active mass present in the S @ C composite, which is 67%. Even with this capacity, the energy density of the Li—C @ S battery is >600 Wh/kg, which is significantly higher than the energy density of the state of the art Li-ion batteries. As mentioned earlier, this excellent electrochemical stability of the S @ C composite can be attributed to the carbon used as the host structure for sulfur infusion.

Figure 20:
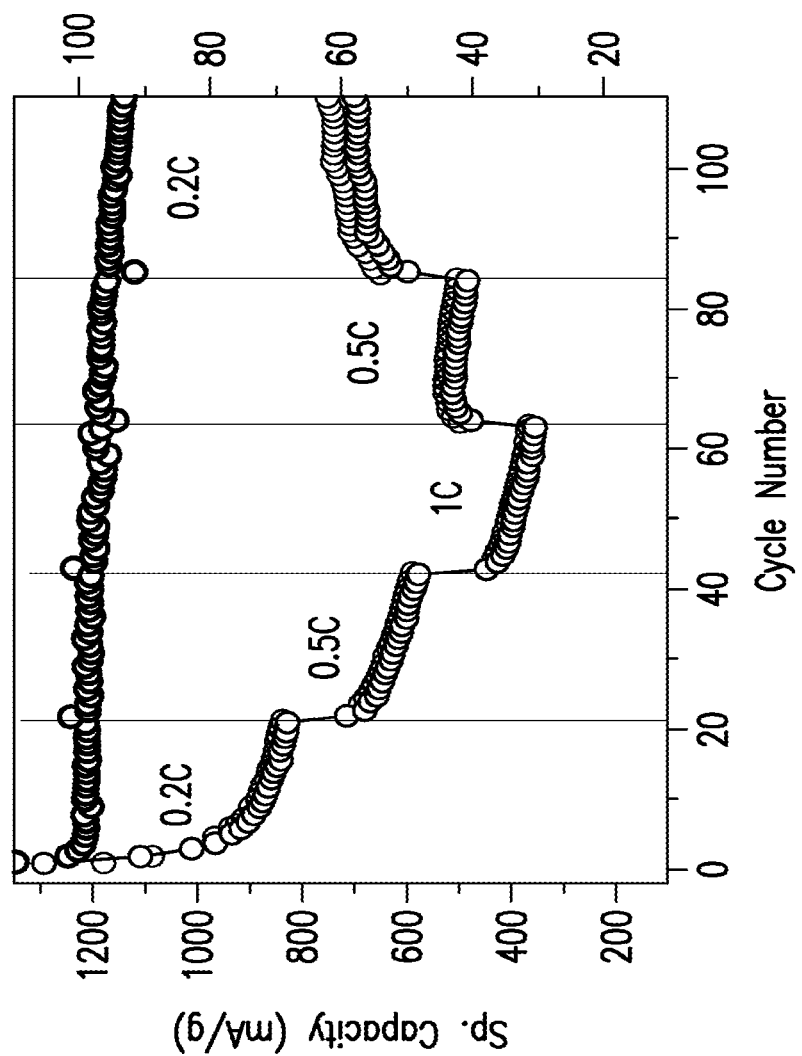
FIG. 20 shows the rate capability of a Li—S battery according to one embodiment.
Figures 21A, 21B:
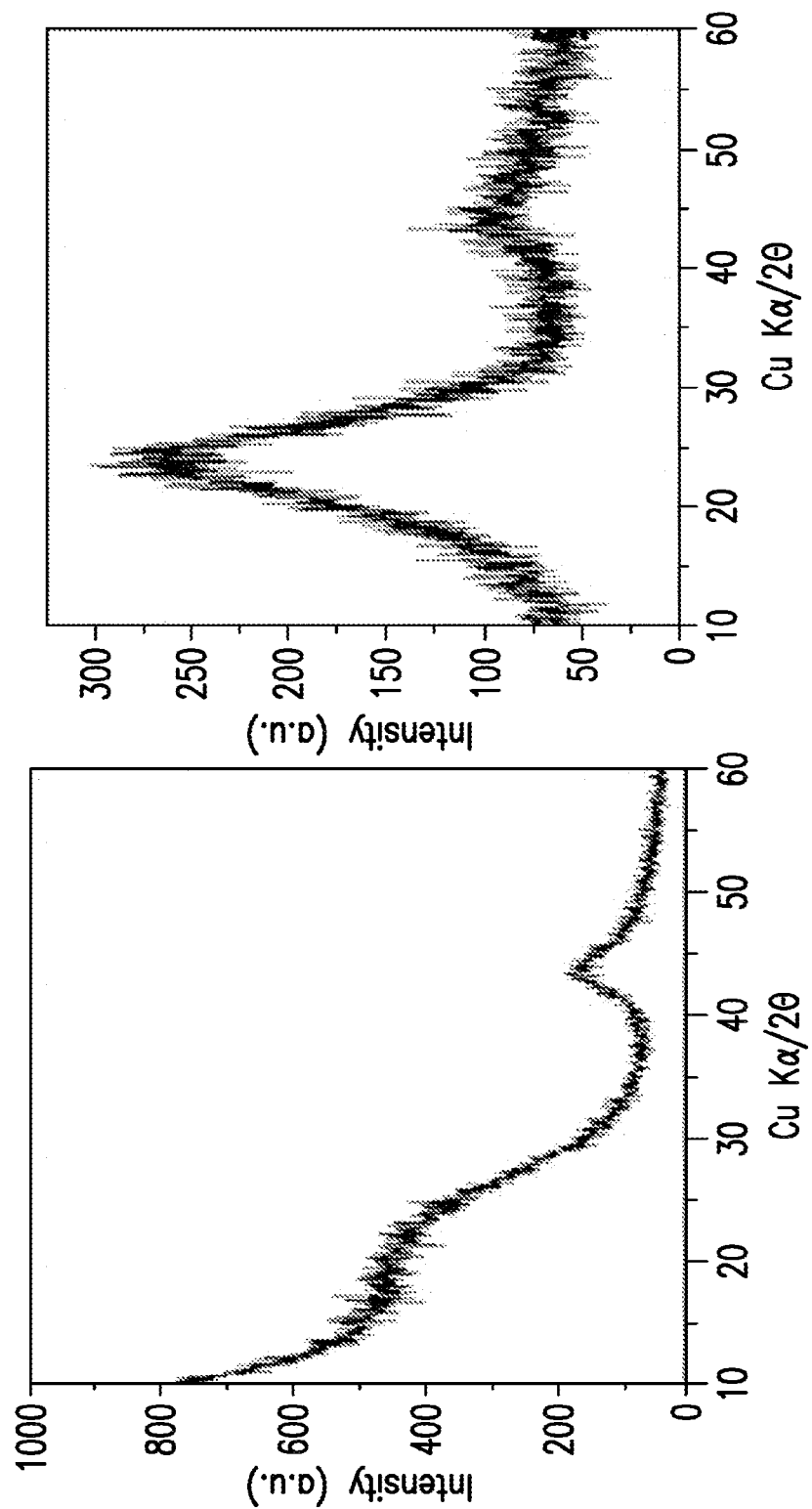
FIGS. 21A and 21B shows the XRD patterns of FIG. 21A activated coconut carbon and FIG. 21B sulfur infused activated coconut carbon using the titanium reactor.

FIG. 20 shows the rate capability of a Li—S battery according to one embodiment of the invention. Cycle life was carried out at a constant. Rate capability study was carried out at various current rates calculated based on the percentage of sulfur active mass (67%) present in the cathode composite. The rate capability behavior of the Li—S battery at higher rates is shown in FIG. 20. At the maximum discharge rate studied, 1 C, the Li—S battery is seen to deliver 410 mAh/g. The stability of the cathode material is also evidenced by the recovery of a capacity of 720 mAh/g at 0.2 C rate following charging at the rather high rate of 1 C.

Example 6. Physical and Electrochemical Properties of S @ C Composite Produced Using a Titanium Reactor In this example, a tube-shaped reactor body was made of titanium alloy which is capable of withstanding sulfur atmosphere and pressure. The reactor design is very simple but effective for infusing sulfur into porous carbon structures at high temperature. A normal tube furnace was used to heat the reactor for sulfur infusion. A particular furnace was designed for this purpose to ensure maximum heating and contact with the reactor. This titanium alloy reactor was found to be capable of processing ~200-500 g of S @ C composite.

To check the microstructure and the graphitic character of the activated coconut carbon before and after sulfur infusion using this large scale reactor, the materials were characterized by powder XRD. FIG. 20 shows the powder XRD patterns of the carbon before and after sulfur infusion, which exhibits peaks at 20-28 and 45° that can respectively, be ascribed to (002) and (101) planes associated with the graphitic pore walls. No apparent peak due to sulfur was noticed in the powder XRD pattern of the S @ C composite. This is very similar to the XRD of the infused material in Example 5.

Figure 23:
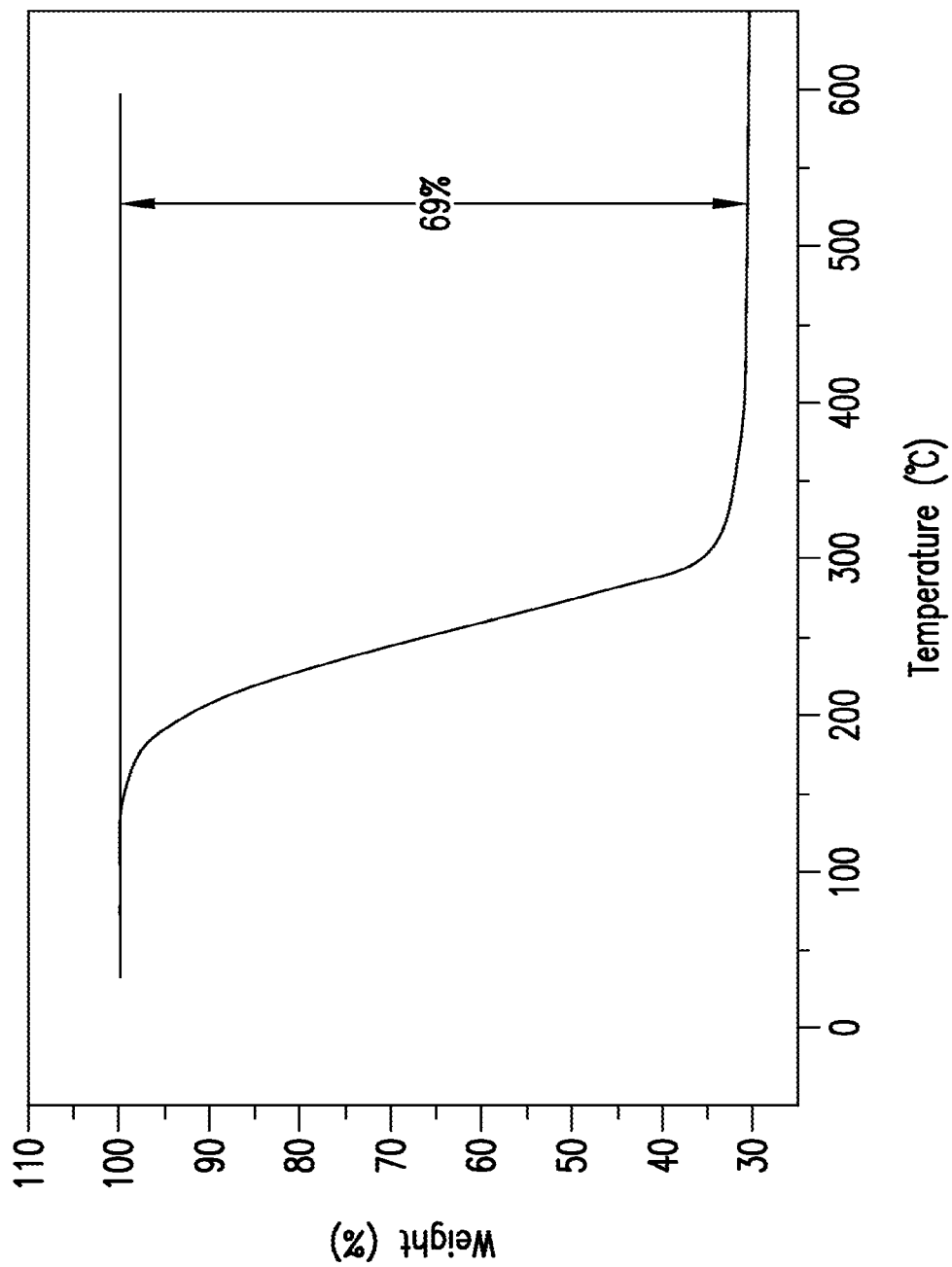
FIG. 23 shows the Thermo Gravimetric Analysis (TGA) recorded for the S @ C composite in Example 6 displaying the presence of 69% sulfur in the composite.

FIGS. 22A and 22B show Transmission Electron Microscopy of the coconut carbon before and after sulfur infusion in the titanium Reactor. The highly porous nature of the activated coconut carbon is clearly visible from the TEM images obtained. Thermo Gravimetric Analysis plot shown in FIG. 23 illuminates nearly 69% of the mass of the S @ C composite is comprised of sulfur, indicating high efficiency for infusing sulfur.

Figure 24:
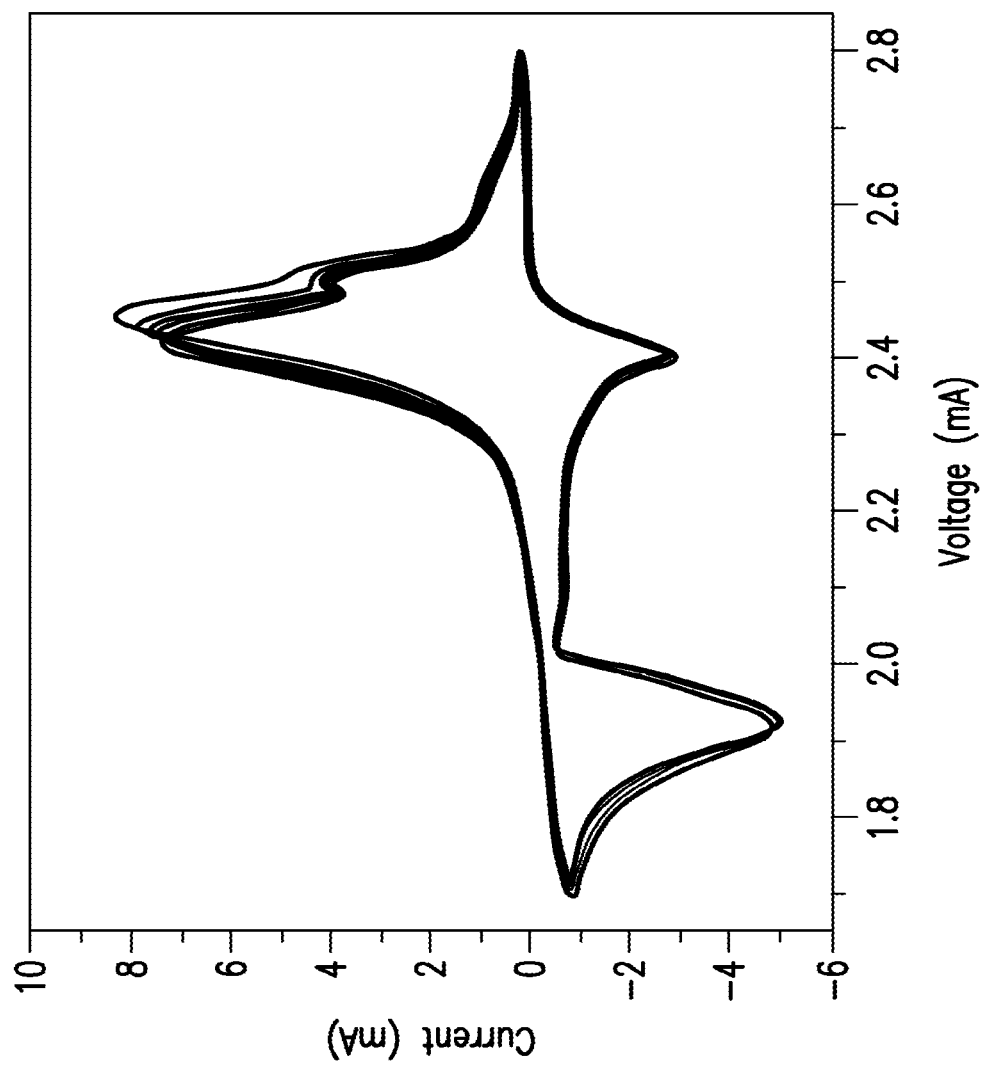
FIG. 24 shows typical cyclic voltammogram of the S @ C composite in Example 6 at a sweep rate 0.2 mV/s under the potential window 1.7-2.8 V.

FIG. 24 shows the cyclic voltammogram (CV) of the titanium reactor S @ C composite studied in the potential range of 1.7-2.8 V vs. Li/Li+ at a scan rate of 0.2 mV/s. The voltammogram obtained was similar to that of the pattern reported for Li—S batteries with the lab based composite as well as the reactor in Example 5. The CV pattern of the synthesized S @ C composite exhibit a pair of cathodic peaks at −2.4 and −1.9 V and a corresponding pair of anodic peaks at −2.35 and 2.45 V.

Figure 25A:
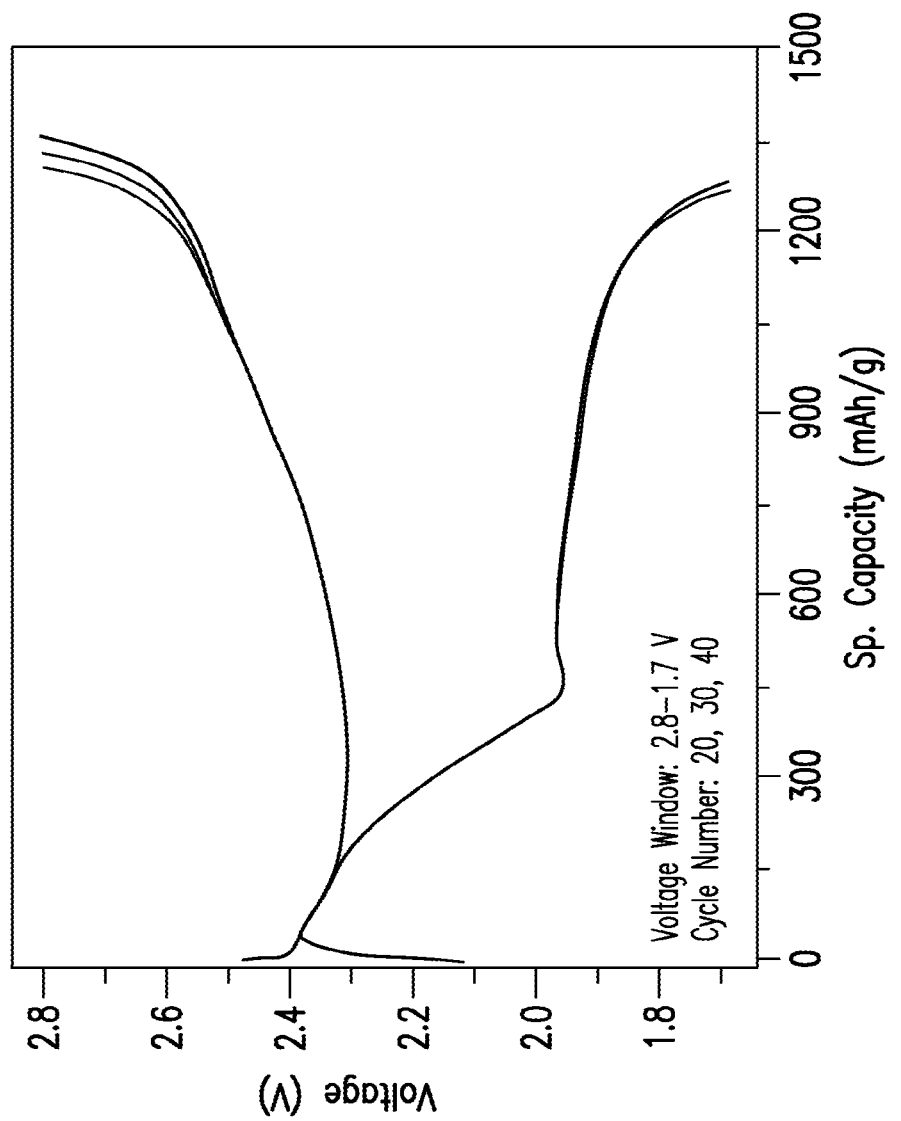
Figure 25B:
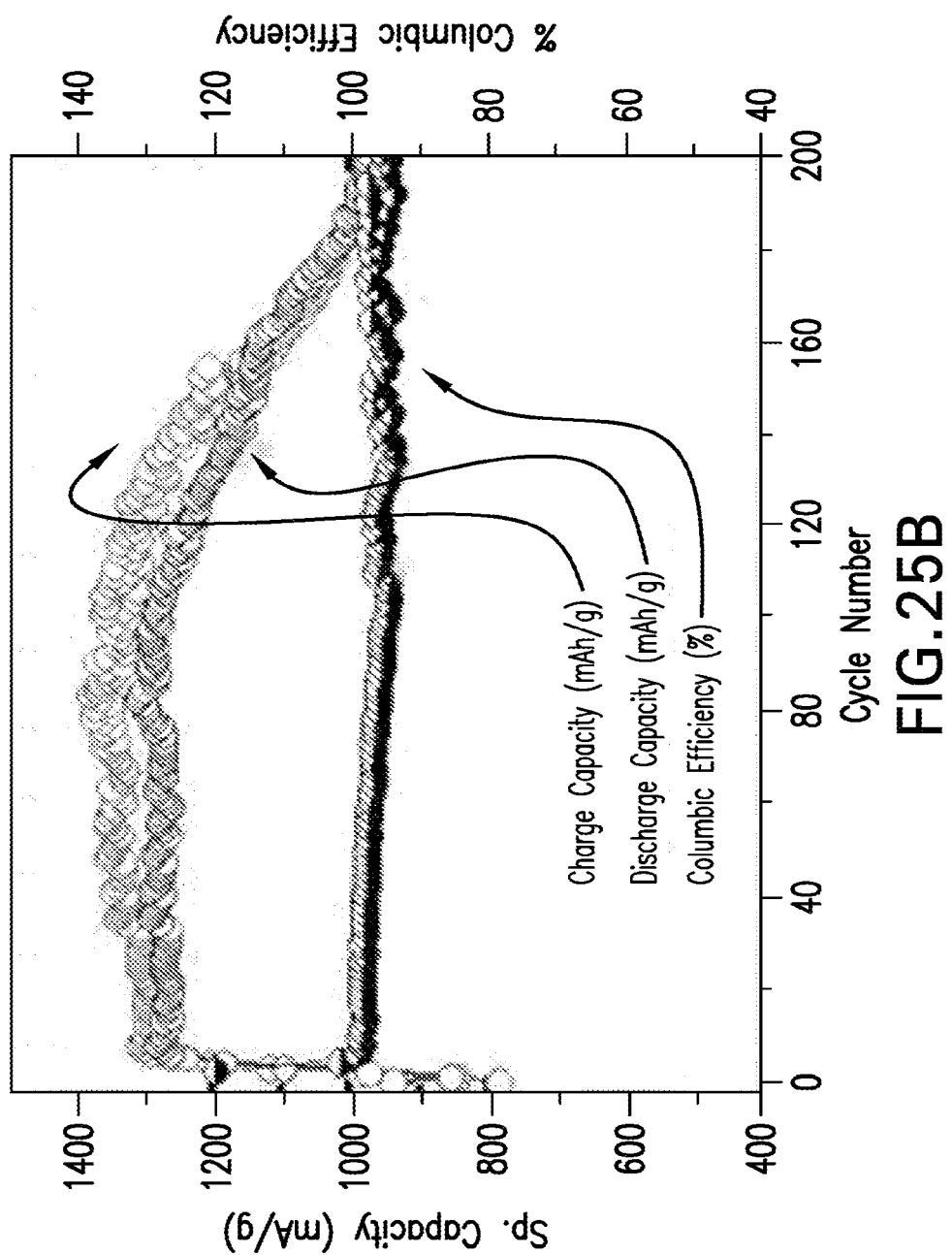

FIGS. 25A-25C shows the electrochemical discharge and charge of the titanium Li—S batteries at 0.2 and 1 C current rates. FIG. 25A shows typical discharge/charge voltage profiles for the S @ C composite which exactly resemble the redox peaks observed in the CV scans. As shown in FIG. 25B, the Li—S battery manifest an initial specific discharge capacity of 1270 mAh/g (after the formation cycle) and maintains a reversible capacity of 970 mAh/g (at a rate of 0.2 C) with 93% capacity retention after 200 cycles. At 1 C current rate (FIG. 25C), the titanium Li—S battery has exhibited an initial discharge capacity of 1150 mAh/g which has been maintained at 610 mAh/g with a columbic efficiency of 93-98% at the end of 200 cycles. Herein, the current rate is based on the theoretical capacity of sulfur and the capacity is reported in terms of the percentage of the sulfur active mass present in the S @ C composite, which is 69%.

The energy density of the Li—S @ C battery is >800 Wh/kg, which is significantly higher than the energy density of the state of the art Li-ion batteries. As mentioned earlier, this excellent electrochemical stability of the S @ C composite can be attributed to the carbon used as the host structure for sulfur infusion.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What claimed is:

1. A reactor for producing a sulfur-infused carbonaceous material as a cathode material for use in a Li—S battery, comprising:
    a reactor body configured to withstand a pressure from about 1 atm to about 150 atm; and
    an inner sulfur-resistant layer at the inner surface of the reactor body, wherein the inner layer is inert to sulfur vapor at a temperature from about 450° C. to about 1000° C., wherein the reactor body and the inner layer are made of the same material selected from the group consisting of titanium, molybdenum, Tungsten and a combination thereof.

2. The reactor of claim 1, wherein the inner layer is a sheath or liner configured to slide in and out of the reactor body.

3. The reactor of claim 1, wherein the inner layer is a coating coated on the inner surface of the reactor body.

4. A reactor for producing a sulfur-infused carbonaceous material as a cathode material for use in a Li—S battery, comprising:
- a reactor body configured to withstand a pressure from about 1 atm to about 150 atm; and
- an inner sulfur-resistant layer at the inner surface of the reactor body, wherein the inner layer is inert to sulfur vapor at a temperature from about 450° C. to about 1000° C., wherein the reactor body and the inner layer are made of different materials, wherein the reactor body is made of a material selected from the groups consisting of titanium, molybdenum, Tungsten, stainless steel, and a combination thereof, and wherein the inner layer is made of a material selected from the group consisting of titanium, molybdenum, Tungsten, quartz, alumina, silicon carbide, Nucerite 7040 (Pfaudler), Nitraglass 6510 (Pfaudler), SiO2, and a combination thereof.

5. The reactor of claim 4, wherein the inner layer is a sheath or liner configured to slide in and out of the reactor body.

6. The reactor of claim 4, wherein the inner layer is a coating coated on the inner surface of the reactor body.

* * * * *